US012338008B2

(12) United States Patent
Luke Soe Thura Win et al.

(10) Patent No.: US 12,338,008 B2
(45) Date of Patent: Jun. 24, 2025

(54) MONOCOPTER

(71) Applicant: Singapore University of Technology and Design, Singapore (SG)

(72) Inventors: Luke Soe Thura Win, Singapore (SG); Shane Kyi Hla Win, Singapore (SG); Shaohui Foong, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 0 days.

(21) Appl. No.: 18/682,655

(22) PCT Filed: Sep. 16, 2022

(86) PCT No.: PCT/SG2022/050669
§ 371 (c)(1),
(2) Date: Feb. 9, 2024

(87) PCT Pub. No.: WO2023/043378
PCT Pub. Date: Mar. 23, 2023

(65) Prior Publication Data
US 2024/0262541 A1  Aug. 8, 2024

(30) Foreign Application Priority Data

Sep. 17, 2021  (SG) .......................... 10202110304V

(51) Int. Cl.
*B64U 10/13* (2023.01)
*B64U 20/50* (2023.01)
(Continued)

(52) U.S. Cl.
CPC ............. *B64U 10/13* (2023.01); *B64U 20/50* (2023.01); *B64U 30/16* (2023.01); *B64U 50/13* (2023.01)

(58) Field of Classification Search
CPC ........ B64U 10/13; B64U 20/50; B64U 30/16; B64U 50/13; B64U 10/20; B64U 30/10; B64D 29/02; B64C 9/12
See application file for complete search history.

(56) References Cited

U.S. PATENT DOCUMENTS

| 1,133,660 A | 3/1915 | Papin et al. |
| 1,413,316 A * | 4/1922 | Bradley ............... A63H 33/185 446/34 |

(Continued)

FOREIGN PATENT DOCUMENTS

| CN | 103693195 A | 4/2014 |
| CN | 107697285 A | 2/2018 |

OTHER PUBLICATIONS

Grasmeyer J and Keennon M, 2001, "Development of the Black Widow micro air vehicle," p. 127 39th Aerospace Sciences Meeting and Exhibit.
(Continued)

*Primary Examiner* — Medhat Badawi

(57) ABSTRACT

According to various embodiments, there may be provided a monocopter. The monocopter may include a body chassis. The monocopter may further include a wing structure extending from the body chassis, the body chassis being at a root of the wing structure. The wing structure may include a plurality of rigid wing segments distributed along a spanwise direction extending between the root and a tip of the wing structure. The wing structure may further include a plurality of flexible wing segments, each flexible wing segment adjoining a pair of adjacent rigid wing segments of the plurality of rigid wing segments. The monocopter may further include a propulsion unit coupled to a rigid wing segment of the plurality of rigid wing segments between a midspan of the wing structure and the tip of the wing structure.

15 Claims, 20 Drawing Sheets

(51) Int. Cl.
*B64U 30/16* (2023.01)
*B64U 50/13* (2023.01)

(56) References Cited

U.S. PATENT DOCUMENTS

| | | | | | |
|---|---|---|---|---|---|
| 1,651,273 | A | * | 11/1927 | Heller | A63H 33/185 473/569 |
| 3,744,741 | A | * | 7/1973 | Christian | A63H 27/001 244/49 |
| 4,485,991 | A | * | 12/1984 | Fuller | B64C 3/56 416/240 |
| 5,078,339 | A | * | 1/1992 | Lapidot | B64C 39/068 244/3.28 |
| 5,173,069 | A | * | 12/1992 | Litos | A63H 33/185 473/590 |
| 5,810,636 | A | * | 9/1998 | Harned | A63H 33/185 446/265 |
| 5,813,625 | A | * | 9/1998 | Hassan | B64C 27/467 244/17.11 |
| 6,082,671 | A | * | 7/2000 | Michelson | B64U 10/40 249/11 |
| 6,626,397 | B2 | * | 9/2003 | Yifrach | B64D 5/00 244/76 R |
| 7,766,274 | B1 | * | 8/2010 | Jameson | B64U 10/20 244/6 |
| 8,201,773 | B1 | * | 6/2012 | Durham | B64U 10/80 244/49 |
| 8,205,822 | B1 | * | 6/2012 | Jameson | B64C 27/00 244/17.11 |
| 8,366,055 | B2 | * | 2/2013 | Ulrich | B64U 10/25 244/17.11 |
| 8,528,863 | B2 | * | 9/2013 | Sanderson | B64U 70/50 244/49 |
| 8,698,059 | B2 | * | 4/2014 | Nikkel | F42B 10/16 244/38 |
| 8,720,822 | B2 | * | 5/2014 | Vaneck | B64C 3/185 244/123.1 |
| 9,193,458 | B2 | * | 11/2015 | Pongratz | B64C 37/02 |
| 9,199,718 | B2 | * | 12/2015 | Fogarty | A63H 33/18 |
| 9,950,790 | B2 | * | 4/2018 | Keennon | B64C 19/00 |
| 10,017,248 | B2 | * | 7/2018 | Samuel | B64C 33/02 |
| 10,065,737 | B2 | * | 9/2018 | Keennon | B64C 33/02 |
| 10,118,696 | B1 | * | 11/2018 | Hoffberg | B64C 39/024 |
| 10,279,891 | B2 | * | 5/2019 | Krebs | G05D 1/0841 |
| 10,464,668 | B2 | * | 11/2019 | Evulet | B64D 27/20 |
| 10,875,658 | B2 | * | 12/2020 | Evulet | B64D 27/18 |
| 11,371,355 | B2 | * | 6/2022 | Govindan | F03B 3/04 |
| 11,453,492 | B2 | * | 9/2022 | Low | B64U 30/12 |
| 11,628,955 | B2 | * | 4/2023 | Selfridge | B64U 10/60 244/158.2 |
| 12,134,043 | B2 | * | 11/2024 | Paterra | A63H 27/10 |
| 12,151,834 | B2 | * | 11/2024 | Win | B64U 20/80 |
| 12,202,612 | B2 | * | 1/2025 | Win | F42B 10/56 |
| 2004/0118969 | A1 | * | 6/2004 | MacCready | B64D 37/30 244/5 |
| 2004/0245393 | A1 | * | 12/2004 | Ifju | A63H 27/007 244/123.1 |
| 2015/0183515 | A1 | * | 7/2015 | Vander Lind | F03D 5/00 174/72 A |
| 2016/0114887 | A1 | * | 4/2016 | Zhou | H04N 23/51 348/148 |
| 2016/0244144 | A1 | * | 8/2016 | Karem | H04B 7/18506 |
| 2018/0346095 | A1 | * | 12/2018 | Elson | B64C 3/26 |
| 2019/0382104 | A1 | * | 12/2019 | Low | B64C 27/22 |
| 2020/0055585 | A1 | * | 2/2020 | Hung | B64C 9/12 |
| 2020/0192404 | A1 | * | 6/2020 | Pizarro | B64C 13/50 |
| 2021/0129987 | A1 | * | 5/2021 | Foong | G05D 1/101 |
| 2021/0253235 | A1 | * | 8/2021 | Solstin | B64U 50/19 |
| 2021/0291979 | A1 | * | 9/2021 | Cattano | F03D 5/04 |
| 2022/0063841 | A1 | * | 3/2022 | Selfridge | B64G 1/10 |
| 2022/0073052 | A1 | * | 3/2022 | Zhou | B64U 20/40 |
| 2022/0212779 | A1 | * | 7/2022 | Randall | B64C 5/12 |
| 2023/0312142 | A1 | * | 10/2023 | Win | B64U 30/10 244/6 |
| 2023/0348075 | A1 | * | 11/2023 | Win | B64D 19/02 |
| 2023/0356836 | A1 | * | 11/2023 | Von Bertouch | B64U 30/293 |
| 2024/0071196 | A1 | * | 2/2024 | Joao | B64U 10/14 |
| 2024/0239529 | A1 | * | 7/2024 | Pheh | B64U 30/299 |
| 2024/0262530 | A1 | * | 8/2024 | Chantrill | B64C 3/56 |
| 2024/0262541 | A1 | * | 8/2024 | Win | B64U 30/16 |
| 2024/0327042 | A1 | * | 10/2024 | Foong | B64U 50/34 |

OTHER PUBLICATIONS

Giernacki W, Skwierczyński M, Witwicki W, Wroński P and Kozierski P, 2017, "Crazyflie 2.0 quadrotor as a platform for research and education in robotics and control engineering" (IEEE) 37-42 2017 22nd Int. Conf. Methods and Models in Automation and Robotics (MMAR).

Norberg R Å, 1973, "Autorotation, self-stability, and structure of single-winged fruits and seeds (samaras) with comparative remarks on animal flight," Biol. Rev. 48 561-96.

Lee E-J and Lee S-J, 2016, "Effect of initial attitude on autorotation flight of maple samaras (*Acer palmatum*)," J. Mech. Sci. Technol. 30 741-47.

Zakaria M Y, dos Santos C R, Dayhoum A, Marques F D and Hajj M R, "Modeling and prediction of aerodynamic characteristics of free fall rotating wing based on experiments," IOP Conf. Ser.: Mater. Sci. Eng. 610 012098.

Yasuda K and Azuma A, 1997, "The autorotation boundary in the flight of samaras," J. Theor. Biol. 185 313-20.

Ulrich E and Pines D, 2008, "Planform geometric variation, and its effect on the autorotation efficiency of a mechanical samara," Annual Forum Proc.-American Helicopter Society vol. 64 p. 1138.

Kellas A, 2007, "The guided samara: design and development of a controllable single-bladed autorotating vehicle," Massachusetts Institute of Technology Master's Thesis.

Pounds P E and Singh S P 2013, "Integrated electro-aeromechanical structures for low-cost, self-deploying environment sensors and disposable UAVs" ((IEEE)) 4459-66 2013 IEEE Int. Conf. Robotics and Automation.

Win S K H, Win L S T, Sufiyan D, Soh G S and Foong S, 2019, "Dynamics and control of a collaborative and separating descent of samara autorotating wings," IEEE Robot. Autom. Lett. 4 3067-74.

Win SKH, Win L S T, Sufiyan D, Soh G S and Foong S, 2021, "An agile samara-inspired single-actuator aerial robot capable of autorotation and diving," IEEE Trans. Robot. 1-14.

Houghton J and Hoburg W, 2008, "Fly-by-wire control of a monocopter," Project Report (Massachusetts Institute of Technology).

Ulrich E R, Pines D J and Humbert J S, 2010, "From falling to flying: the path to powered flight of a robotic samara nano air vehicle," Bioinsp. Biomim. 5 045009.

Win L S T, Win S K H, Sufiyan D, Soh G S and Foong S, 2020, "Achieving efficient controlled flight with a single actuator" (IEEE) pp. 1625-1631 2020 IEEE/ASME Int. Conf. Advanced Intelligent Mechatronics (AIM).

Zhang W, Mueller M W and D'Andrea R, 2016, "A controllable flying vehicle with a single moving part" (IEEE) pp. 3275-3281 2016 IEEE Int. Conf. Robotics and Automation (ICRA).

Piccoli M and Yim M, 2017, "Piccolissimo: the smallest micro aerial vehicle," (IEEE) pp. 3328-3333 2017 IEEE Int. Conf. Robotics and Automation (ICRA).

Ifju P Jenkins D, Ettinger S, Lian Y, Shyy W and Waszak M, 2002, "Flexible-wing-based micro air vehicles," p. 705 40th AIAA Aerospace Sciences Meeting & Exhibit.

Wood R J, 2008, "The first takeoff of a biologically inspired at-scale robotic insect," IEEE Trans. Robot. 24 341-47.

Nguyen Q V and Chan WL, 2018, "Development and flight performance of a biologically-inspired tailless flapping-wing micro air vehicle with wing stroke plane modulation," Bioinsp. Biomim. 14 p. 016015.

De Wagter C, Karásek M and de Croon G, 2018, "Quad-thopter: tailless flapping wing robot with four pairs of wings," Int. J. Micro Air Veh. 10 244-53.

(56) References Cited

OTHER PUBLICATIONS

Chen Y, Xu S, Ren Z and Chirarattananon P, 2021, "Collision resilient insect-scale soft-actuated aerial robots with high agility," IEEE Trans. Robot. 1-13.
Kahn A and Edwards D, 2012, "Navigation, guidance and control for the CICADA expendable micro air vehicle," p. 4536 AIAA Guidance, Navigation, and Control Conference.
Keenon M. et al., 2012, "Development of the nano hummingbird: A tailless flapping wing micro air vehicle," 50th AIAA aerospace sciences meeting including the new horizons forum and aerospace exposition p. 588.
Winslow J, Benedict M, Hrishikeshavan V and Chopra I, 2016, "Design, development, and flight testing of a high endurance micro quadrotor helicopter," Int. J. Micro Air Veh. 8 155-69.
Jameson S, Satterfield B, Bolden C, Youngren H and Allen N, 2007, "Samarai nano air vehicle—a revolution in flight," AUVSI Unmanned Systems North America Conf. Proc.
Wick B H, 1954, "Study of the subsonic forces and moments on an inclined plate of infinite span," ((Washington: National Advisory Committee for Aeronautics)) NACA TN-3221.
Jason T. Isaacs et al., "GPS-Optimal Micro Air Vehicle Navigation in Degraded Environments," Proceedings of the American Control Conference, Jun. 2014, Jun. 6, 2014, pp. 1864-1871.

* cited by examiner

Table 1

| Item | Name | Qty | Website |
|---|---|---|---|
| Processor | SparkFun MicroMod ESP32 | 1 | sparkfun.com |
| Motor | ROBO RB 1202.5 | 1 | getfpv.com |
| ESC | EMAX Bullet 30A | 1 | emaxmodel.com |
| Battery | 450mAh 1S 30C | 2 | betafpv.com |
| RC | FrSky Pro Micro | 1 | frsky-rc.com |

FIG. 5A

Table 2

| Parameters | Value |
|---|---|
| Total Weight | 69 g |
| Hover rotation speed | 5.3 Hz |
| Hover current draw | 1.3 A |
| Hover power draw | 9.78 W |
| Wing length | 32 cm |
| Wing area | 229 cm$^2$ |
| Wing aspect ratio | 4.5 |
| Mean chord length | 71.3 cm |
| Flight time | 16 min |
| Unfolded footprint | 266.5 cm$^2$ |
| Folded footprint | 82.3 cm$^2$ |

FIG. 5B

MONOCOPTER

CROSS REFERENCE TO RELATED APPLICATIONS

This application is a U.S. National Stage of PCT/SG2022/050669 filed Sep. 16, 2022, which claims the benefit of Singapore Application No. 10202110304V filed Sep. 17, 2021, and which applications are incorporated herein by reference. To the extent appropriate, a claim of priority is made to each of the above disclosed applications.

TECHNICAL FIELD

Various embodiments generally relate to a monocopter. In particular, various embodiments generally relate to a monocopter (e.g. a micro aerial vehicle monocopter) that may include a foldable (e.g. a semi-rigid) wing structure.

BACKGROUND

Micro aerial vehicles have become increasingly useful and ubiquitous.

Generally, micro aerial vehicles are extremely lightweight (e.g. weighing less than 100 g) and have a small form factor. As such, micro aerial vehicles may be relatively safer to operate indoors and/or in environments with humans or animals.

Conventionally, there are three main types of micro aerial vehicles: fixed-wing micro aerial vehicles, rotary wings micro aerial vehicles, and flapping wings micro aerial vehicles.

Fixed-wing micro aerial vehicles may be adept at executing long ranged missions, but may not be suitable for applications within confined spaces due to its continuous forward movement (or inability to hover).

Rotary wings micro aerial vehicles (e.g. of the helicopter type) may be capable of hovering. However, they typically involve a complex design which may include multiple actuators, a swashplate, etc. Furthermore, the rotary wings structures of such rotary wings micro aerial vehicles tend to be bulky.

Flapping wings micro aerial vehicles, similar to rotary wings micro aerial vehicles, tend to be bulky and difficult to store and transport.

Accordingly, there is a need to provide a more versatile aerial vehicle (e.g. micro aerial vehicle) which addresses at least the above issues.

SUMMARY

According to various embodiments, there may be provided a monocopter. The monocopter may include a body chassis. The monocopter may further include a wing structure extending from the body chassis, the body chassis being at a root of the wing structure. The wing structure may include a plurality of rigid wing segments distributed along a spanwise direction extending between the root and a tip of the wing structure. The wing structure may further include a plurality of flexible wing segments. Each flexible wing segment adjoining a pair of adjacent rigid wing segments of the plurality of rigid wing segments. The monocopter may further include a propulsion unit coupled to a rigid wing segment of the plurality of rigid wing segments between a midspan of the wing structure and the tip of the wing structure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 5A shows a "Table 1" listing some parts for building a prototype of the monocopter of FIG. 3A, according to various embodiments;

FIG. 5B shows a "Table 2" listing specifications of the prototype of the monocopter of FIG. 3A, according to various embodiments;

DETAILED DESCRIPTION

Figure 1:
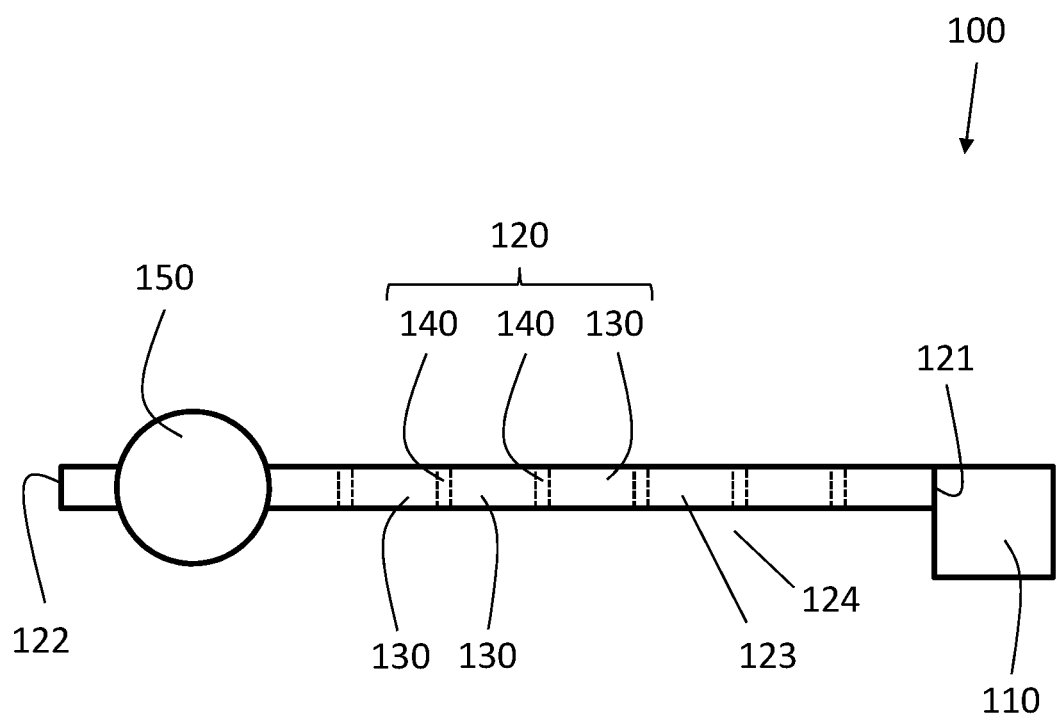
FIG. 1 is a schematic front view of a monocopter, according to various embodiments.

Embodiments described below in the context of the apparatus are analogously valid for the respective methods, and vice versa, as well as for a corresponding kit. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a monocopter (e.g. an aerial vehicle with a single rotating blade).

In particular, various embodiments may relate to a single-actuator monocopter which may include a semi-rigid wing (e.g. semi-rigid wing structure). Specifically, the semi-rigid wing may be a foldable, single wing structure of the monocopter. With the foldable wing structure, the monocopter may be folded into a more compact size to reduce its footprint (e.g. by about 65% to 75%, or about 68% to 70%, or about 69%). According to various embodiments, the foldable wing structure of the monocopter may have, but is not limited to, a flat-plate airfoil for facilitating easy folding of the wing structure.

According to various embodiments, although the foldable wing structure of the monocopter may be limp when the monocopter is resting on an external floor surface (e.g. an external ground), the monocopter may leverage on centrifugal forces, resulting from the monocopter rotating about its center of gravity during flight, to straightened its foldable wing structure.

According to various embodiments, a large portion of the entire monocopter may form the foldable wing structure (e.g. single wing structure) for generating useful aerodynamic forces. Thus, the monocopter of the various embodiments may be an efficient (e.g. high-efficiency) aerial vehicle.

According to various embodiments, the monocopter may be capable of accomplishing a controllable flight (e.g. in 5 degrees of freedom) by using only one thrust unit (e.g. single propulsion unit, e.g. having a single motor or engine). Specifically, altitude control of the monocopter may be achieved by the monocopter by way of regulating a force or thrust generated from the thrust unit (e.g. propulsion unit) of the monocopter throughout multiple rotations of the monocopter during its flight. Further, lateral control of the monocopter may be achieved by the monocopter by way of pulsing the thrust unit (e.g. propulsion unit) of the monocopter at specific instances during each cycle of rotation of the monocopter (or rotation of the wing structure of the monocopter) during its flight.

According to various embodiments, the monocopter may include a body (e.g. a body chassis) for housing one or more electrical components (e.g. flight avionics, and/or flight battery, i.e. power source, and/or electrical circuits/boards/cables/connectors). Particularly, the body may include a first member and a second member. The flight battery (e.g. two single cell lithium polymer batteries connected in series to supply power for avionics and flight) may be mounted to the first member of the body. According to various embodiments, the second member of the body may be or may include a purpose-designed autopilot board. The flight avionics may be mounted on the autopilot board (i.e. second member). According to various embodiments, the autopilot board (i.e. second member) may provide most of the structural rigidity of the body. The body may further include a 3D-printed structure, such as a flexible hinge, which may allow the body to be folded at the flexible hinge.

According to various embodiments, the wing structure of the monocopter may form the largest portion of the monocopter, while having a lowest mass proportion relative to the other components of the monocopter. By having a low mass, a center of gravity of the monocopter may be positioned or shifted nearer to the body (e.g. the body chassis) of the monocopter, thereby allowing a large portion of the wing structure to interact with the surrounding air for generating useful aerodynamic forces to enable the monocopter to manoeuvre (e.g. turn or hover) or fly in the air.

The monocopter according to the various embodiments may be designed to rotate counter-clockwise (i.e. when looking from a top view of the monocopter) or, alternatively, may be designed to rotate clockwise, for flight. That is, an airfoil of the wing structure of the monocopter may be configured with any suitable shape capable of generating useful aerodynamic forces for flying the monocopter.

Additionally, according to various embodiments, the monocopter may be configured to be a micro aerial vehicle. Accordingly, the monocopter may be easily transportable and may be deployed swiftly for any application (e.g. military or civilian applications, such as for surveillance, for research, or for search and rescue and reconnaissance missions).

FIG. 1 is a schematic front view of a monocopter 100, according to various embodiments.

According to various embodiments, there may be provided the monocopter 100. The monocopter 100 may be an aerial vehicle capable of flying in the air, wherein the aerial vehicle may include a single wing structure 120 or blade.

With reference to FIG. 1, according to various embodiments, the monocopter 100 may include a body chassis 110, a wing structure 120 (or a single wing structure) extending from the body chassis 110, and a propulsion unit 150 coupled to the wing structure 120.

The body chassis 110 of the monocopter 100 may be configured to hold or carry one or more electrical components. The one or more electrical components may include, for example, any one or a combination of a power source (e.g. at least one battery, solar generator, etc.), a processor, a circuit board (e.g. printed circuit board), a magnetometer (e.g. compass), an accelerometer, a gyroscope, a camera, an autopilot board (e.g. autopilot circuit board or a controller), a flight board, a flight controller, etc. As an example, the body chassis 110 may be a casing or a frame with one or more compartments and/or one or more supports (e.g. support plate) for holding or carrying the one or more electrical components.

As shown, according to various embodiments, the body chassis 110 of the monocopter 100 may be at a root 121 (e.g.

a first longitudinal end or proximal end) of the wing structure 120 of the monocopter 100. In other words, the wing structure 120 of the monocopter 100 may be extending from the body chassis 110, with the body chassis 110 disposed or positioned at the root 121 of the wing structure 120 of the monocopter 100. As an example, the root 121 of the wing structure 120 (or a corresponding rigid wing segment of the wing structure 120 at the root 121 of the wing structure 120) of the monocopter 100 may be affixed or attached (e.g. detachably attached) to the body chassis 110 of the monocopter 100 via one or a combination of an adhesive, a screw, a nut and bolt assembly, or any other suitable fastener or coupling element. According to various embodiments, the wing structure 120 may form a joint (e.g. a rigid joint, or hinged/rotary joint, e.g. with one or more hinges) with the body chassis 110, at the root 121 of the wing structure 120. For example, when the joint is a rigid joint, the wing structure 120 may be immovable at the root 121 of the wing structure 120 with respect to the body chassis 110. As another example, when joint is a hinged/rotary joint, the wing structure 120 may be rotated about the root 121 of the wing structure 120 with respect to the body chassis 110.

According to various embodiments, the wing structure 120 may be a single unit or single entity. In other words, according to various embodiments, the monocopter 100 may include a single or only one wing (i.e. a single or only one wing structure 120).

As shown in FIG. 1, according to various embodiments, the wing structure 120 of the monocopter 100 may include a plurality of rigid wing segments 130 and a plurality of flexible wing segments 140. Each of the plurality of rigid wing segments 130 and/or each of the plurality of flexible wing segments 140 may be a corresponding section or a corresponding portion of the wing structure 120. Accordingly, the wing structure 120 may be divided or sliced into multiple segments (e.g. sections), whereby some of the segments form the plurality of rigid wing segments 130 and some other segments form the plurality of flexible wing segments 140. As shown, the plurality of rigid wing segments 130 may be distributed along a spanwise (or lengthwise) direction extending between the root 121 and a tip 122 (e.g. a second longitudinal end opposite the first longitudinal end, or a distal end) of the wing structure 120. Further, as shown, each flexible wing segment may be between (e.g. interposing, or directly between) and/or may be adjoining a pair of adjacent or neighboring (e.g. immediately adjacent or neighboring) rigid wing segments 130 of the plurality of rigid wing segments 130. Accordingly, as shown, the plurality of rigid wing segments 130 and the plurality of flexible wing segments 140 of the wing structure 120 of the monocopter 100 may be arranged in an alternating pattern or arrangement, with respect to one another, along the spanwise direction. Hence, the wing structure 120 may be divided or sliced into multiple segments (e.g. sections) along its span with alternating rigid wing segment and flexible wing segment.

According to various embodiments, each flexible wing segment of the wing structure 120 may serve as a hinge, interconnecting a corresponding pair of adjacent or neighboring rigid wing segments 130 of the plurality of rigid wing segments 130 of the wing structure 120. According to various embodiments, the wing structure 120 may be foldable at the plurality of flexible wing segments 140. Accordingly, the wing structure 120 of the monocopter 100 may be foldable or capable of being rolled, at the plurality of flexible wing segments 140, into a compact size or form (herein referred to as a "folded configuration" of the wing structure 120) to reduce its footprint (e.g. for storage, transportation, etc., of the monocopter 100).

According to various embodiments, the wing structure 120 of the monocopter 100 may have (in other words, include) an airfoil, for example, any one of a laminar flow airfoil, a symmetrical airfoil, a cambered airfoil, or a flat-plate airfoil, etc., which may be capable of generating an aerodynamic force when the wing structure 120 interacts with a stream of air. According to various embodiments, each of the plurality of rigid wing segments 130 and each of the plurality of flexible wing segments 140 of the wing structure 120 may be a segment of a single wing structure 120 having a uniform airfoil type (e.g. from the root 121 to the tip 122 of the single wing structure 120). For example, all of the plurality of rigid wing segments 130 and all of the plurality of flexible wing segments 140 may have a flat-plate airfoil. For ease of illustration, various embodiments of the monocopter 100 may be described herein or illustrated with the wing structure 120 of the monocopter 100 having a flat-plate airfoil. Nevertheless, it is understood that the wing structure 120 of the monocopter 100 of the various embodiments is not limited thereto. Thus, for example, the wing structure 120 of the monocopter 100 of the various embodiments may have any one of a laminar airfoil, a symmetrical airfoil, or a cambered airfoil, etc.

According to various embodiments, a spanwise dimension (e.g. a length, measured along the spanwise direction) of each of the plurality of rigid wing segments 130 may be larger or longer than a spanwise dimension of each of the plurality of flexible wing segments 140. Further, each of the plurality of rigid wing segments 130 and each of the plurality of flexible wing segments 140 may be extending from a leading edge 123 (e.g. front edge) of the wing structure 120 to a trailing edge 124 (e.g. rear edge) of the wing structure 120. As such, according to various embodiments, a total area or volume of the plurality of rigid wing segments 130 of the wing structure 120 may be larger than a total area or volume of the plurality of flexible wing segments 140 of the wing structure 120. In other words, according to various embodiments, the plurality of rigid wing segments 130 may be a major part or portion of the wing structure 120. In such a configuration, the wing structure 120 may be less susceptible to (in other words, may be sufficiently supported against) unintentional twisting forces acting on the wing structure 120 when the monocopter 100 is maneuvering or flying in the air. According to various embodiments, the plurality of flexible wing segments 140 may further be configured to provide sufficient support against any unintentional twisting forces acting on the wing structure 120 when the monocopter 100 is maneuvering or flying in the air.

According to various embodiments, the wing structure 120 of the monocopter 100 may have a wing planform (e.g. a shape or outline of the wing structure 120 across a horizontal plane of the wing structure 120, when the wing structure 120 is in an unfolded configuration) which may be tapered. For example, the wing planform of the wing structure 120 may be of a tapered quadrilateral shape. Specifically, the wing structure 120 may be tapered along the spanwise direction, in a manner such that a root chord of the wing structure 120 (e.g. a width of the wing structure 120 at the root 121) may be larger or longer than a tip chord of the wing structure 120 (e.g. a width of the wing structure 120 at the tip 122). According to various other embodiments, the wing planform of the wing structure 120 may be any one of a rectangular shape (e.g. with a leading edge 123 and a trailing edge 124 of the wing structure 120 being parallel with each other), a triangular shape, a compound tapered shape, an elliptical shape, or a "samara" shape (described later with reference to FIG. 4), etc.

According to various embodiments, the propulsion unit 150 of the monocopter 100 may be configured to generate a force or a thrust. For example, the propulsion unit 150 may include a propeller type propulsion unit, or jet type propulsion unit, or propulsive nozzle type propulsion unit, etc. According to various embodiments, the propeller type propulsion unit may include at least one motor (e.g. brushless motor) or engine and at least one propeller coupled to the motor or engine. As shown in FIG. 1, the propulsion unit 150 may be coupled to a corresponding rigid wing segment of the plurality of rigid wing segments 130 of the wing structure 120 of the monocopter 100. In particular, the propulsion unit 150 may be disposed between a midspan of the wing structure 120 and the tip 122 of the wing structure 120 (i.e. between a midpoint or center or middle of the wing structure 120 and the distal end of the wing structure 120). For example, the propulsion unit 150 may be disposed proximally or near to the tip 122 of the wing structure 120, specifically, coupled to a second, or a third, etc., rigid wing segment from the tip 122 of the wing structure 120. Accordingly, when the propulsion unit 150 is coupled to the second, or the third, etc. rigid wing segment from the tip 122 of the wing structure 120, the one or more rigid wing segment(s) at and/or from the tip 122 of the wing structure 120 may serve to protect the propulsion unit 150 of the monocopter 100 from a direct impact of a spinning or rotating monocopter 100 during flight onto an external structure (e.g. an external wall or building). Additionally, the one or more rigid wing segment(s) at and/or from the tip 122 of the wing structure 120, together with one or more corresponding flexible wing segment(s) of the wing structure 120, may serve as a dampener of the monocopter 100 for absorbing an impact force to the monocopter 100 from any direct impact of the monocopter 100 onto an external structure. According to various other embodiments (not shown), the propulsion unit 150 may be at the tip 122 (e.g. at the second longitudinal end) of the wing structure 120, specifically, coupled to a corresponding rigid wing segment at the tip 122 of the wing structure 120.

The various components of the monocopter 100 (e.g. the propulsion unit 150, the body chassis 110, etc.) may be arranged in a manner such that the center of gravity of the monocopter 100 (e.g. when the wing structure 120 of the monocopter 100 is in an unfolded configuration) may be near or proximal to the body chassis 110 of the monocopter 100. Specifically, the center of gravity of the monocopter 100 may be between the midspan of the wing structure 120 and the root 121 of the wing structure 120 (e.g. when the wing structure 120 of the monocopter 100 is in an unfolded configuration). According to various embodiments, the monocopter 100 may be configured to spin or rotate about its center of gravity during flight. As such, a large portion (e.g. most) of the wing structure 120, specifically, the portion of the wing structure 120 between the tip 122 or the point where the propulsion unit 150 may be disposed on the wing structure 120 and the center of gravity of the monocopter 100, may be utilized for generating useful aerodynamic forces for maneuvering or flying the monocopter 100 in the air.

Figure 2A:
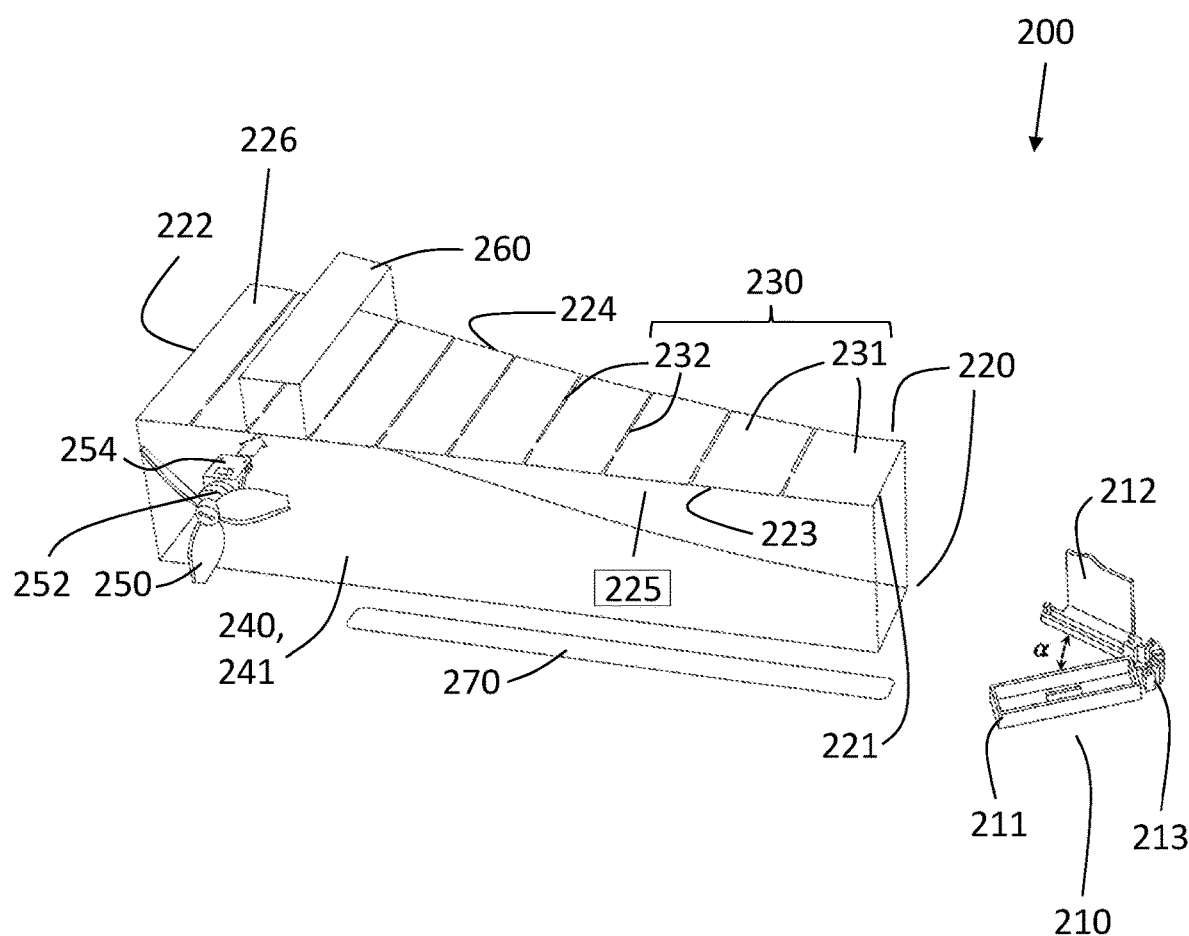
FIG. 2A is a perspective exploded view of a monocopter including a wing structure having a tapered wing planform, according to various embodiments.

FIG. 2A is a perspective exploded view of a monocopter 200 including a wing structure 220 having a tapered wing planform, according to various embodiments.

According to various embodiments, there may be provided the monocopter 200.

According to various embodiments, the monocopter 200 may contain any one or more or all the features and/or limitations of the monocopter 100 of FIG. 1. In the following, the monocopter 200 is described with like reference characters generally referring to the same or corresponding parts/features of the monocopter 100 of FIG. 1. The description of the parts/features made with respect to the monocopter 200 may be applicable with respect to the monocopter 100, and vice versa.

According to various embodiments, the monocopter 200 may, similar to the monocopter 100 of FIG. 1, include a body chassis 210, a wing structure 220 extending from the body chassis 210, and a propulsion unit 250 coupled to the wing structure 220.

The wing structure 220 of the monocopter 200 may, similar to the wing structure 120 of the monocopter 100 of FIG. 1, include a plurality of rigid wing segments 230 and a plurality of flexible wing segments 240. As shown in FIG. 2A, the plurality of rigid wing segments 230 may include, but is not limited to, ten rigid wing segments 230 (e.g. ten sections). Further, the plurality of flexible wing segments 240 may include, but is not limited to, nine flexible wing segments 240 (e.g. nine sections).

Particularly, as shown in FIG. 2A, according to various embodiments, the plurality of rigid wing segments 230 of the wing structure 220 may include a plurality (e.g. nine pieces) of discrete rigid panels 231. As shown, the plurality of discrete rigid panels 231 (i.e. slabs, leaves, or flat piece) of the wing structure 220 may be spaced apart from each other with a plurality of discontinuities 232 (e.g. gaps) among or between the plurality of discrete rigid panels 231. In other words, each discontinuity of the plurality of discontinuities 232 may be between a pair of adjacent or neighboring discrete rigid panels 231. As an example, according to various embodiments, each pair of adjacent or neighboring discrete rigid panels 231 may be spaced between about 0.6 mm to about 1.7 mm (e.g. 1 mm) apart from each other. In other words, each discontinuity 232 may be about 1 mm wide. According to various embodiments, each of the plurality of discrete rigid panels 231 may be made of a rigid or substantially rigid material, such as wood, metal, carbon fiber, rigid plastic or polymer, or Styrofoam, etc.

Further, as shown in FIG. 2A, the plurality of flexible wing segments 240, according to various embodiments, may be part of at least one flexible sheet 241. According to various embodiments, the at least one flexible sheet 241 may be attached across the plurality of discrete rigid panels 231 in a manner so as to expose a plurality of portions of the at least one flexible sheet 241 at the plurality of discontinuities 232 (i.e. among or between the plurality of discrete rigid panels 231) to form the plurality of flexible segments of the wing structure 220. In other words, the at last one flexible sheet 241 may cover across the plurality of discontinuities 232. As shown in FIG. 2A, as an example, according to various embodiments, the at least one flexible sheet 241 may be a single flexible sheet (e.g. single continuous flexible sheet without any discontinuities 232) attached to a single surface (e.g. a bottom surface 225, i.e. "pressure surface") of the wing structure 220. Accordingly, as shown, according to various embodiments, a shape of the single flexible sheet may correspond (e.g. may be similar or identical) to a shape of the wing planform of the wing structure 220 (e.g. a shape of the bottom surface 225 of the wing structure 220). As another example, according to various other embodiments (not shown), the at least one flexible sheet 241 may be either (i) two discrete flexible sheets or (ii) a single flexible sheet folded in a manner so as to be attached to opposite surfaces (e.g. the bottom surface 225 and a top surface 226, i.e. "suction surface", opposite the bottom surface 225) of the wing structure 220. As yet another example, according to various other embodiments (not shown), the at least one flexible sheet 241 may be a plurality of discrete flexible sheets. The plurality of discrete flexible sheets, according to various other embodiments, may correspond to a number of discontinuities 232 among or between the plurality of discrete rigid panels 231, and may be for covering across the plurality of discontinuities 232. According to various embodiments, the flexible sheet 241 may be made of a flexible material, such as flexible plastic or polymer, paper, cardboard, leather, etc.

As shown in FIG. 2A, according to various embodiments, each rigid wing segment 230 (or each discrete rigid panel 231) and/or each flexible wing segment 240 (or each exposed portion of the flexible sheet 241) may be extending from a leading edge 223 (e.g. front edge) of the wing structure 220 to a trailing edge 224 (e.g. rear edge) of the wing structure 220.

Further, as shown in FIG. 2A, the wing structure 220 of the monocopter 200 may include a tapered wing planform. In particular, a chord of each of the plurality of rigid wing segments 230 (e.g. rigid panels 231), measured along a direction extending between the leading edge 223 and the trailing edge 224 of the wing structure 220, may progressively be longer, in a direction from the root 221 (e.g. first longitudinal end) of the wing structure 220 to the tip 222 (e.g. second longitudinal edge) of the wing structure 220. Specifically, a chord of a respective rigid wing segment at the tip 222 of the wing structure 220 may be longer than a chord of another respective rigid wing segment at the root 221 of the wing structure 220.

Further, as shown in FIG. 2A, according to various embodiments, the leading edge 223 of the wing structure 220 may form a straight (e.g. substantially straight) line. In particular, the leading edges 223 of each of the rigid wing segments 230 (e.g. rigid panels 231) may be aligned along a straight line (e.g. reference line). According to various embodiments, as shown, the (straight) leading edge 223 of the wing structure 220 may be perpendicular (e.g. substantially perpendicular) to a straight edge of the wing structure 220 at the root 221 of the wing structure 220. Further, as shown, according to various embodiments, the root 221 and the tip 222 of the wing structure 220 may include or may be a pair of parallel (e.g. substantially parallel) straight edges of the wing structure 220.

Figure 2B:
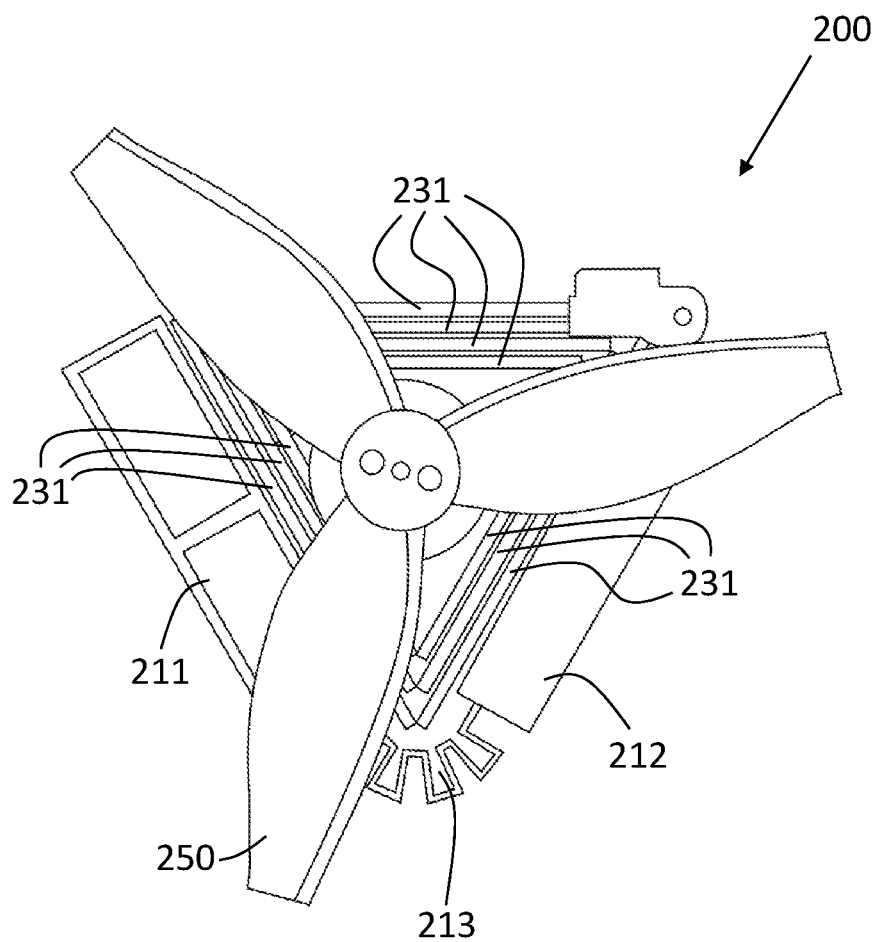
FIG. 2B shows the monocopter of FIG. 2A, with the wing structure of the monocopter in a folded configuration, according to various embodiments.

FIG. 2B shows the monocopter 200 of FIG. 2A, with the wing structure 220 of the monocopter 200 in a folded configuration, according to various embodiments.

According to various embodiments, in order for the wing structure 220 of the monocopter 200 to be capable of being folded into the configuration as shown in FIG. 2B, a spanwise dimension (e.g. length, measured along the spanwise direction) of each of the plurality of rigid segments may progressively increases or become larger in a direction from a respective rigid segment at the first longitudinal end (i.e. root 221 or proximal end) of the wing structure 220 to a respective rigid segment at the second longitudinal end (i.e. tip 222 or distal end) of the wing structure 220.

Referring back to FIG. 2A, the monocopter 200 may include (e.g. further include) a coupling element 254 (e.g. a motor mount, e.g. 3D-printed motor mount, or a bracket) for coupling the propulsion unit 250 (e.g. a body of the motor 252 or engine) to the wing structure 220 of the monocopter 200. As shown, the coupling element 254 may include a clip for attaching the coupling element 254 to an edge (e.g. the leading edge 223) of the wing structure 220 at a respective rigid wing segment. In other words, the coupling element 254 may enable to the propulsion unit 250 (or the motor 252 of the propulsion unit 250) to be mounted to the edge (e.g. the leading edge 223) of the wing structure 220. According to various embodiments, in mounting the propulsion unit 250 directly onto the edge of the wing structure 220, a more compact-sized folded structure (i.e. folded monocopter 200) may be achieved.

As shown in FIG. 2A, according to various embodiments, the monocopter 200 may include (e.g. further include) a reinforcing plate 260 attached to the rigid wing segment of the plurality of rigid wing segments 230 that the propulsion unit 250 may be or is being coupled. As an example, the reinforcing plate 260 may include or may be a carbon fiber plate or a metal plate. As shown, a shape of the reinforcing plate 260 may correspond to a shape of the rigid wing segment 230 (e.g. upper or lower surface of the rigid wing segment) that the propulsion unit 250 may be coupled.

Figure 2C:
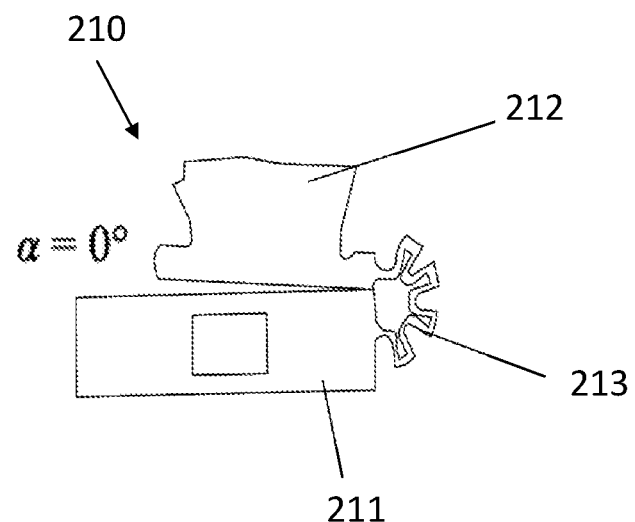
FIG. 2C is a side view of the body chassis of the monocopter of FIG. 2A, in a folded configuration of the body chassis, according to various embodiments.
Figure 2D:
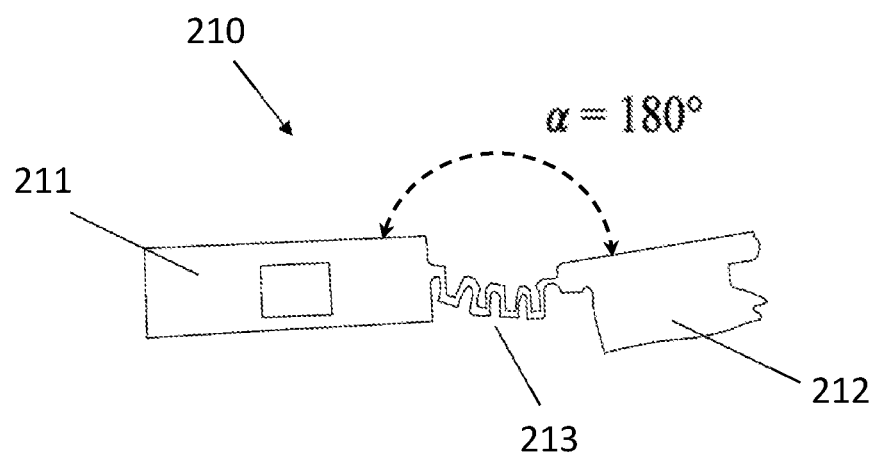
FIG. 2D is a side view of the body chassis of the monocopter of FIG. 2A, in an unfolded configuration of the body chassis, according to various embodiments.

FIG. 2C is a side view of the body chassis 210 of the monocopter 200 of FIG. 2A, in a folded configuration of the body chassis 210, according to various embodiments; and FIG. 2D is a side view of the body chassis 210 of the monocopter 200 of FIG. 2A, in an unfolded configuration of the body chassis 210, according to various embodiments.

With reference to FIG. 2A to FIG. 2C, the body chassis 210 of the monocopter 200 may include a first member 211, a second member 212, and a hinge 213 interconnecting the first member 211 and the second member 212. According to various embodiments, the first member 211 may be a first holder for holding or carrying a first electrical component (i.e. of the one or more electrical components) and the second member 212 may be a second holder for holding or carrying a second electrical component (i.e. of the one or more electrical components). As an example, the first member 211 (e.g. a container or casing) may be configured to hold or carry a power source while the second member 212 (e.g. a support plate) may be configured to hold or carry a flight board. In addition, the power source may be electrically connected to the flight board, so that the flight board may be capable of drawing power from the power source.

According to various embodiments, the hinge 213 of the body chassis 210 may be or may include a flexible hinge 213. For example, the hinge 213 of the body chassis 210 may be of a same material (e.g. a polymer) as the first member 211 and the second member 212, but may differ structurally from the first member 211 and the second member 212 in that the hinge 213 may include a plurality of pleats or corrugations or may be a living hinge 213 or may be a series of articulated joints to enable the hinge 213 to be flexible (or capable of bending without breaking). Accordingly, it may be possible for the entire body chassis 210 to be manufactured via a 3D-printing process using a single material for 3D-printing the body chassis 210.

As shown in FIG. 2C, the body chassis 210 may be folded at the hinge 213 with the first member 211 brought towards (e.g. abutting, contacting, or stacked against, etc.) the second member 212, such that an inner surface of each of the first member 211 and the second member 212 may form an angle ($\alpha$) of 0°. Alternatively, the body chassis 210 may be unfolded towards the arrangement as shown in FIG. 2D, with the inner surface of each of the first member 211 and the second member 212 forming an angle ($\alpha$) of 180°.

According to various embodiments, the body chassis 210 may be configurable or may be capable of changing or shifting the center of gravity (and, in turn, a center of rotation) of the monocopter 200 (i.e. when the wing structure 220 is in the unfolded configuration), by folding or unfolding the body chassis 210 at the hinge 213. For example, when the body chassis 210 is folded, the center of gravity of the monocopter 200 may be at a first point along the wing structure 220. When the body chassis 210 is unfolded, the center of gravity of the monocopter 200 may be shifted to a second point along the wing structure 220. Accordingly, according to various embodiments, when the body chassis 210 is in the folded configuration as shown in FIG. 2C, a moment of inertia of a spinning or rotating the monocopter 200 during flight may be low (or decreased), thereby causing the monocopter 200 to fly with a higher spin rate (e.g. during hovering of the monocopter 200). On the other hand, when the body chassis 210 is in the unfolded configuration as shown in FIG. 2D, the moment of inertia may be increased, resulting in a lower spin rate of the monocopter 200 during flight or hovering of the monocopter 200.

Referring back to FIG. 2A, according to various embodiments, the monocopter 200 may include the one or more electrical components which may be held by the body chassis 210. In particular, the monocopter 200 may include at least the power source (e.g. depicted with reference numeral 371 in FIG. 3B).

Additionally, as shown in FIG. 2A, the monocopter 200 may include an electrical element 270. The electrical element 270 may be electrically connected to the propulsion unit 250 (e.g. the motor 252 of the propulsion unit 250) and to the one or more electrical components (e.g. to at least the power source) of the monocopter 200. Accordingly, the propulsion unit 250 may receive power (e.g. electrical power) from the power source via the electrical element 270 of the monocopter 200. According to various embodiments, the electrical element 270 may include or may be a flexible wire, flexible cable, polymide flex, flexible printed circuit board (PCB), or flexible circuit etc.

Figure 3A:
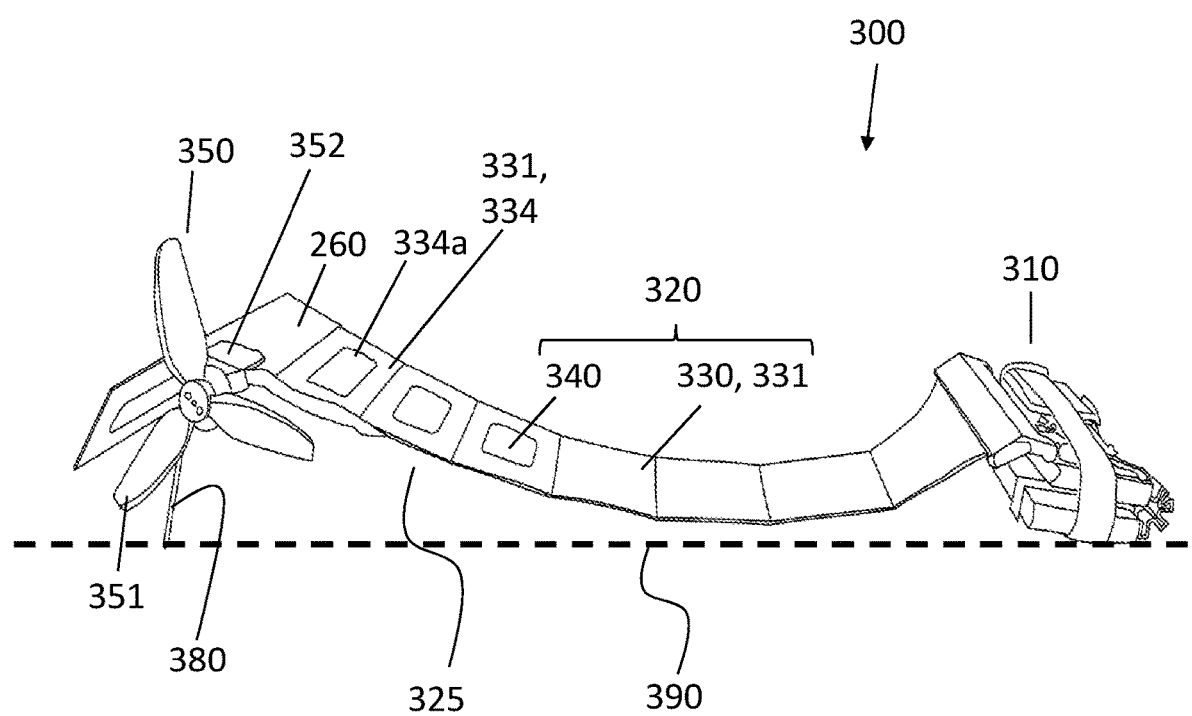
FIG. 3A is a perspective view of a monocopter which includes a wing structure with at least one rigid closed-loop frame structure, according to various embodiments.
Figure 3B:
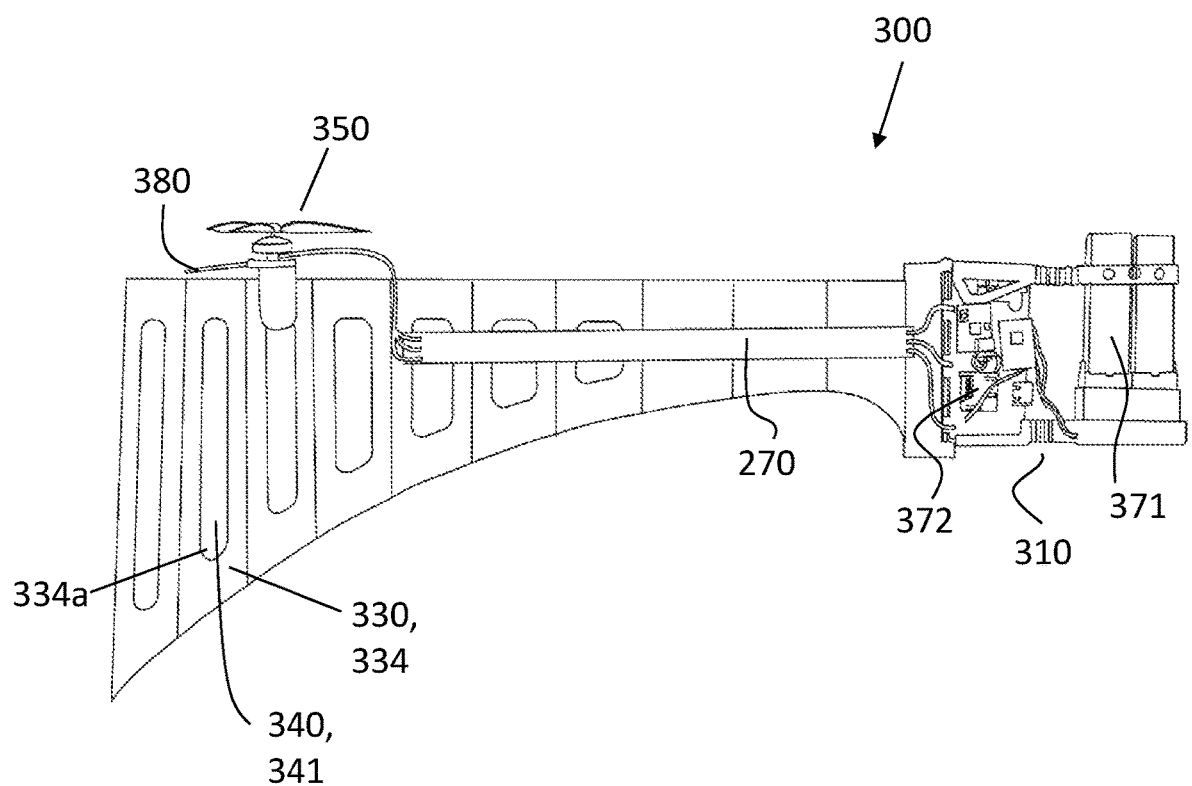
FIG. 3B is a bottom view of the monocopter of FIG. 3A, according to various embodiments.

According to various embodiments, the monocopter 200 may further include a controller (e.g. autopilot board, depicted with reference numeral 372 in FIG. 3B). Accordingly, according to various embodiments, the electrical element 270 may further connect the controller to the propulsion unit 250.

FIG. 3A is a perspective view of a monocopter 300 which includes a wing structure 320 with at least one rigid closed-loop frame structure 334, according to various embodiments; and FIG. 3B is a bottom view of the monocopter 300 of FIG. 3A, according to various embodiments.

According to various embodiments, there may be provided the monocopter 300.

According to various embodiments, the monocopter 300 may contain any one or more or all the features and/or limitations of the monocopter 100 of FIG. 1 and/or the monocopter 200 of FIG. 2A. In the following, the monocopter 300 is described with like reference characters generally referring to the same or corresponding parts/features of the monocopter 100 of FIG. 1 and/or the monocopter 200 of FIG. 2A. The description of the parts/features made with respect to the monocopter 300 may be applicable with respect to the monocopter 100 and/or the monocopter 200, and vice versa.

According to various embodiments, the monocopter 300 may, similar to the monocopter 100 of FIG. 1 and/or the monocopter 200 of FIG. 2A, include a body chassis 310, a wing structure 320 extending from the body chassis 310, and a propulsion unit 350 coupled to the wing structure 320.

The wing structure 320 of the monocopter 300 may, similar to the wing structure 120 of the monocopter 100 of FIG. 1 and/or the wing structure 220 of the monocopter 200 of FIG. 2A, include a plurality of rigid wing segments 330 and a plurality of flexible wing segments 340.

The plurality of rigid wing segments 330 of the wing structure 320 of the monocopter 300 may, similar to the plurality of rigid wing segments 230 of the wing structure 220 of the monocopter 200 of FIG. 2A, include a plurality of discrete rigid panels 331.

The plurality of rigid wing segments 330 of the wing structure 320 of the monocopter 300 may, however, differ from the plurality of rigid wing segments 230 of the wing structure 220 of the monocopter 200 in that one or more or all of the plurality of discrete rigid panels 331 of the wing structure 320 of the monocopter 300 may include a closed-loop frame structure 334 (e.g. an annular-shaped frame structure 334), with each closed-loop frame structure 334 defining a through-hole 334a therewithin. As shown in FIG. 3A and FIG. 3B, each through-hole 334a may be, but is not limited to, a rectangular-shaped through-hole 334a within the closed-loop frame structure 334.

The plurality of flexible wing segments 340 of the wing structure 320 of the monocopter 300 may, similar to the plurality of flexible wing segments 240 of the wing structure 220 of the monocopter 200 of FIG. 2A, include at least one flexible sheet 341 (e.g. a single flexible sheet). As shown in FIG. 3B, the at least one flexible sheet 341 may cover across the through-hole 334a of each of the closed-loop frame structure 334 of the one or more of the plurality of discrete rigid panels 331 of the rigid wing segments 330 of the wing structure 320 of the monocopter 300.

With reference to FIG. 3A, the monocopter 300 may include (e.g. further include) a leg member 380 (e.g. a rod) for propping at least a portion of the wing structure 320 of the monocopter 300 against an external surface (e.g. an external floor surface 390). Accordingly, the leg member 380 may be extending away from a bottom surface 325 (e.g. the pressure surface) of the wing structure 320 of the monocopter 300. For example, the leg member 380 may be disposed on and extending from any one of a corresponding rigid wing segment (e.g. underside of the rigid wing segment) of the plurality of rigid wing segments 330 of the wing structure 320, or may be disposed on and extending from the coupling element 352 coupled to a corresponding rigid wing segment of the plurality of rigid wing segments 330 of the wing structure 320, or may be disposed on and extending from a motor 352 of the propulsion unit 350. According to various embodiments, the leg member 380 be sized (or dimensioned) to lift the propulsion device (e.g. at least the propeller 351 of the propulsion device) off or away from the external floor surface 390 when the monocopter 300 is rested or placed on the external floor surface 390, with the bottom surface 325 of the wing structure 320 of the monocopter 300 (i.e. in the unfolded configuration) directed to the external floor surface 390 (as shown in FIG. 3A). Accordingly, the propulsion device (e.g. the propeller 351 of the propulsion device) may be started while the monocopter 300 is on the external floor surface 390. In other words, the monocopter 300 may take off from the external floor surface 390, for example, from the take-off position of the monocopter 300 as shown in FIG. 3A. According to various other embodiments (not shown), the propulsion device may be started when the monocopter 300 (e.g. when configured as a micro aerial vehicle) is held within an operator's (e.g. a human) hand. The monocopter 300 (e.g. when configured as the micro aerial vehicle) may then be thrown in the air by the operator, with the wing structure 320 in the unfolded configuration, to enable the monocopter 300 to fly in the air.

Figure 3C:
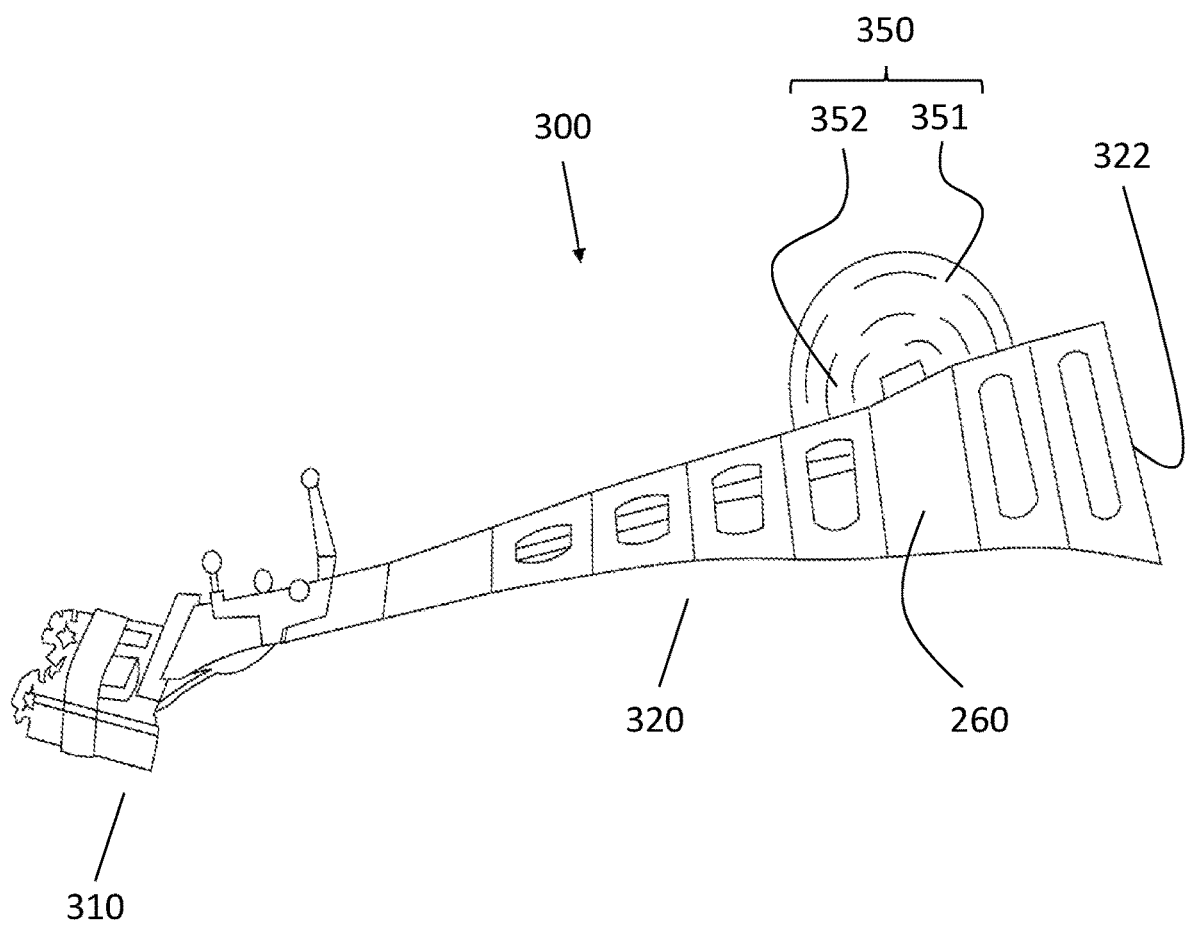
FIG. 3C is a perspective view of the monocopter of FIG. 3A mid-flight, according to various embodiments.

FIG. 3C is a perspective view of the monocopter 300 of FIG. 3A mid-flight, according to various embodiments.

With reference to FIG. 3C, the spinning or rotating monocopter 300 may generate a centrifugal force during its flight which straightens the wing structure 320 of the monocopter 300. Particularly, the centrifugal force may extend (e.g. push) the plurality of rigid wing segments 330 and the plurality of flexible wing segments 340 outwards (e.g. from the center of gravity of the monocopter 300), thereby straightening or "flattening" the wing structure 320 of the monocopter 300 during its flight. More particularly, the spinning mass of (at least) the propulsion unit 350 (e.g. propeller 351 and motor 352), disposed between a midspan of the wing structure 320 and a tip 322 of the wing structure 320 and which may be rotating about the center of gravity of the monocopter 300 (e.g. the center of gravity being proximal to the body chassis 310, or between the midspan of the wing structure 320 and the body chassis 310) during its flight, may create or contribute to creating the centrifugal force for straightening or "flattening" the wing structure 320 of the monocopter 300.

Figure 3D:
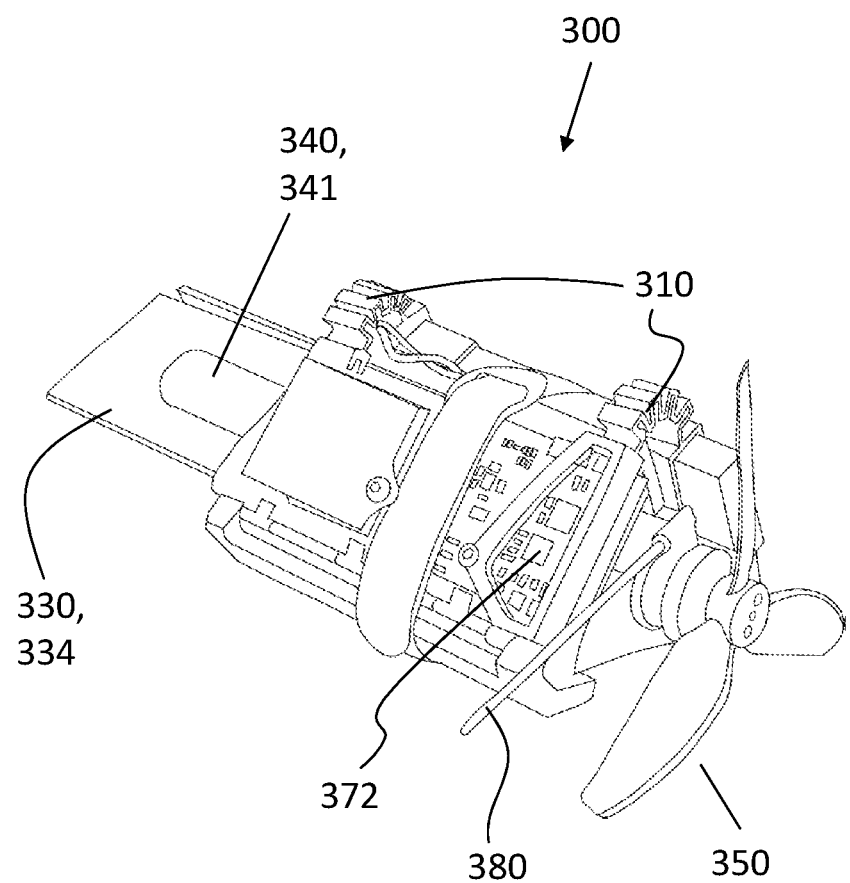
FIG. 3D and FIG. 3E show various views of the monocopter of FIG. 3A folded, according to various embodiments.
Figure 3E:
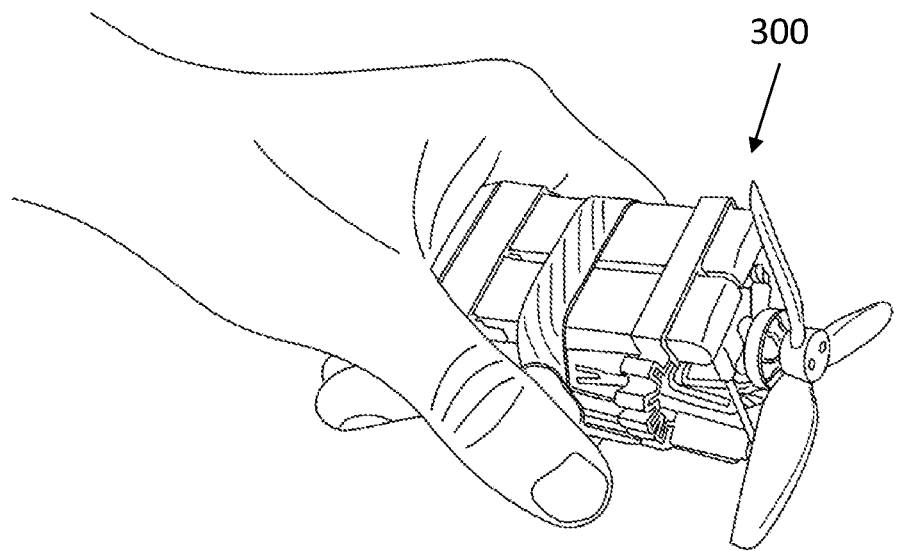

FIG. 3D and FIG. 3E show various views of the monocopter 300 of FIG. 3A folded, according to various embodiments.

As shown in FIG. 3D and FIG. 3E, the monocopter 300 (in particular, the wing structure 320 of the monocopter 300) may be folded or rolled into a smaller size, such that the folded monocopter 300 may be capable of being within an operator's hand (e.g. when the monocopter 300 is configured as a micro aerial vehicle). According to various embodiments, the folded monocopter 300 may be launched from the operator's hand in a manner such that the centrifugal force of the spinning or rotating the monocopter 300 may unfold and straightens the wing structure 320.

Figure 4:
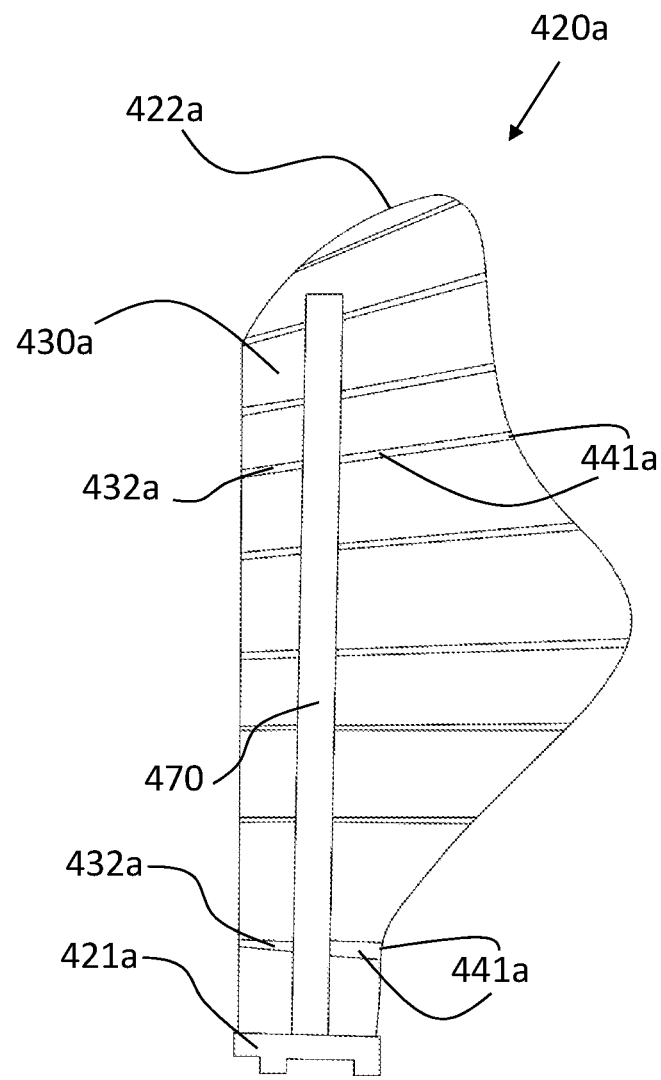
FIG. 4 shows a variant of the wing structure for the monocopter of FIG. 1 or the monocopter of FIG. 2A or the monocopter of FIG. 3A, according to various embodiments.

FIG. 4 shows a variant of the wing structure 420a for the monocopter 100 of FIG. 1 or the monocopter 200 of FIG. 2A or the monocopter 300 of FIG. 3A, according to various embodiments.

According to various embodiments, the variant of the wing structure 420a may include a plurality of wood panels 430a.

The plurality of wood (e.g. balsa wood) panels 430a may be arranged with a plurality of discontinuities 432a among or between the plurality of wood panels 430a. The plurality of wood panels 430a may be joined together by a single sheet of laminated plastic 441a. The plurality of wood panels 430a may be produced by using a laser to precisely cut out the plurality of wood panels 430a from a larger piece of wood. The plurality of wood panels 430a may then be placed within a laminating pouch (e.g. of 125 microns) leaving a tiny gap (e.g. a discontinuity 432a of approximately 1 mm) between each pair of adjacent wood panels 430a. A lamination process may then be carried out. Thereafter, any excess plastic surrounding the plurality of wood panels 430a may be cut (e.g. manually trimmed) away. Optionally, one side of the laminated plastic may be removed (e.g. from a bottom surface or a top surface of the variant of the wing structure 420a), leaving only the plurality of wood panels 430a and one side of laminated plastic 441a sheet forming an assembled variant of the wing structure 420a. The variant of the wing structure 420a may be capable of being folded at its flexible plastic 441a side.

The variant of the wing structure 420a (i.e. a semi-rigid wing structure) may be folded into a neat pre-determined configuration, for example having a triangular or a rectangular shape (e.g. similar to the folded configuration of the wing structure 220, as shown in FIG. 2B).

As shown in FIG. 4, a wing planform of the variant of the wing structure 420a may be of a "samara" shape. That is, a spanwise dimension of one or more rigid segments at an intermediate region of the variant of the wing structure 420a, between the first longitudinal end (i.e. root) 421a and the second longitudinal end (i.e. tip) 422a, of the variant of the wing structure 420a may be larger than a spanwise dimension of each of a respective rigid segment at the first longitudinal end 421a and a respective rigid segment at the second longitudinal end 422a of the wing structure.

Further, as shown in FIG. 4, an electrical element 470 may be attached (e.g. adhered) to the variant of the wing structure 420a.

Figure 5C:
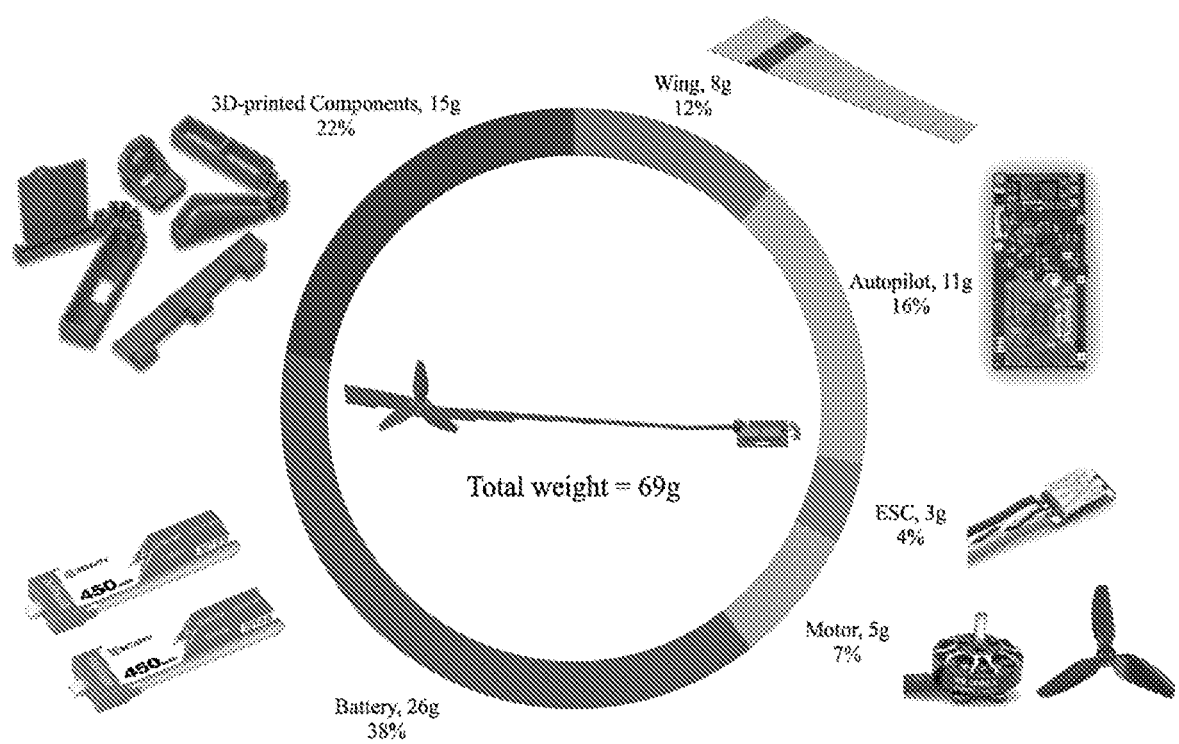
FIG. 5C shows a weight breakdown of the parts for building the prototype of the monocopter of FIG. 3A, according to various embodiments.

FIG. 5A shows a "Table 1" listing some parts for building a prototype of the monocopter 300 of FIG. 3A, according to various embodiments;

FIG. 5B shows a "Table 2" listing specifications of the prototype of the monocopter 300 of FIG. 3A, according to various embodiments; and FIG. 5C shows a weight breakdown of the parts for building the prototype of the monocopter 300 of FIG. 3A, according to various embodiments.

According to various embodiments, a prototype of the monocopter 300 (herein may be referred to as "monocopter prototype") was assembled using 3D-printed components, a laminated wing structure, a custom autopilot board (i.e. electronic component) and a propulsion unit. According to various embodiments, the monocopter prototype may be easily assembled within about 10 minutes. The wing structure of the monocopter prototype may include one or more closed-loop frame structure (e.g. balsa wood with throughholes) for weight reducing (or weight-saving). The throughholes may be assumed to not affect the aerodynamics of the wing structure significantly as the plastic film of the wing structure may still cover an entire surface (e.g. entire bottom surface and/or entire top surface) of the wing structure to form an aerodynamic surface.

The weight breakdown of the parts of the monocopter prototype is shown in FIG. 5C. As shown, the battery and propulsion system may form about 49% of the weight of the monocopter, whereas the wing may form about 12% of the weight of the monocopter. The battery, in particular, contributes a major fraction of the weight at about 38% (e.g. 26 g), while the 3D-printed structural components and autopilot board may in combination form about 38% (e.g. 26 g) of the weight of the monocopter.

In its unfolded state, the monocopter prototype may be about 35 cm in total length. However, once folded, the monocopter prototype's footprint may be reduced by about 65% to 75%, or about 68% to 70%, or about 69%.

The monocopter prototype was flown and its current and power consumption were measured using the INA219 current sensor included in a custom autopilot board. The final specifications of the flying monocopter prototype are listed in Table 2 of FIG. 5B.

The prototype of the monocopter may achieve a flight efficiency of about 7.1 g/W.

Additionally, according to various embodiments, a motion-captured camera system, in which a hybrid Proportional Stabilizer Controller and Proportional-Integral (PI)

Position Controller may be employed, may be used to achieve a closed-loop feedback control of the monocopter prototype.

According to various embodiments, the monocopter prototype may include a custom autopilot board, which may enable the monocopter prototype to be passively stable during flight. The autopilot board may allow the monocopter prototype to be controlled via the closed-loop feedback control in the motion-captured environment and/or by a human operator. The components of the autopilot board may include one or more sensors, a microcontroller, a power regulator, an electronic speed controller, etc., which may be arranged or assembled in a compact-sized manner (e.g. having a narrow and/or rectangular form factor). Particularly, the various components of the autopilot board may be packaged in a manner which may facilitate in folding the monocopter prototype in a more compact manner to minimize its footprint. For an Attitude Heading Reference System of the autopilot board, a combination of a magnetometer and an inertial sensor may be employed. The former may be "LIS3MDLTR", which may be an ultra-low-power high-performance 3-axis magnetometer, capable of an update rate of 500 Hz. The latter may be "ICM20649", which may include a gyroscope and an accelerometer. The gyroscope may have a full-scale range of 4000 degrees per second, thus making it suitable for high rotation speed measurements of the monocopter prototype. As to the microcontroller, "Espressif ESP32" may be employed, for example, in Sparkfun MicroMod configuration. This may allow the microcontroller to be swapped or replaced easily in the event the microcontroller becomes damaged. ESP32 may come with WiFi connectivity, allowing flight telemetry and reconfiguration of parameters wirelessly. An Electronic Speed Controller may be directly soldered onto the control board, and may be capable of receiving control signals directly from the microcontroller as well as providing power to the propulsion unit of the monocopter prototype. The control board may also be configured to include datalogging capability, for example, using a MicroSD card. Additionally, two time-of-flight laser ranging sensors for potential sensing applications as well as a current sensor to measure the power consumption during the flight may be added. Further, a Power Distribution Board may connect two 1S lithium polymer batteries in series (i.e. forming a power source) and may transmit or provide power to the control board.

According to various embodiments, the monocopter prototype may be designed to be light-weight. For example, a total of four 3D-printed parts and two carbon rods may be used to construct the monocopter prototype. Two of the 3D-printed parts may be used to hold the battery (i.e. the power source) and flight board together. One other 3D-printed part may hold a base of the wing structure (e.g. by inserting the 3D-printed part into a tight-fit slot at the base of the wing structure and/or taped or adhered to the base of the wing structure) and may connect to one of the two carbon rods acting as a main hinge between the wing structure and the body (e.g. body chassis). The last 3D-printed part (e.g. which may be a coupling element) may be configured to couple the propulsion unit of the monocopter prototype to the wing structure of the monocopter prototype. A second carbon rod may be employed as a leg member (e.g. a support, a post, etc.) for supporting a portion of the monocopter prototype before and/or during take-off of the monocopter prototype. In particular, the leg member may prevent a propeller (e.g. of the propulsion unit) from touching (e.g. contacting and/or grazing) an external floor surface (e.g. ground) on which the monocopter prototype is placed.

Figure 6A:
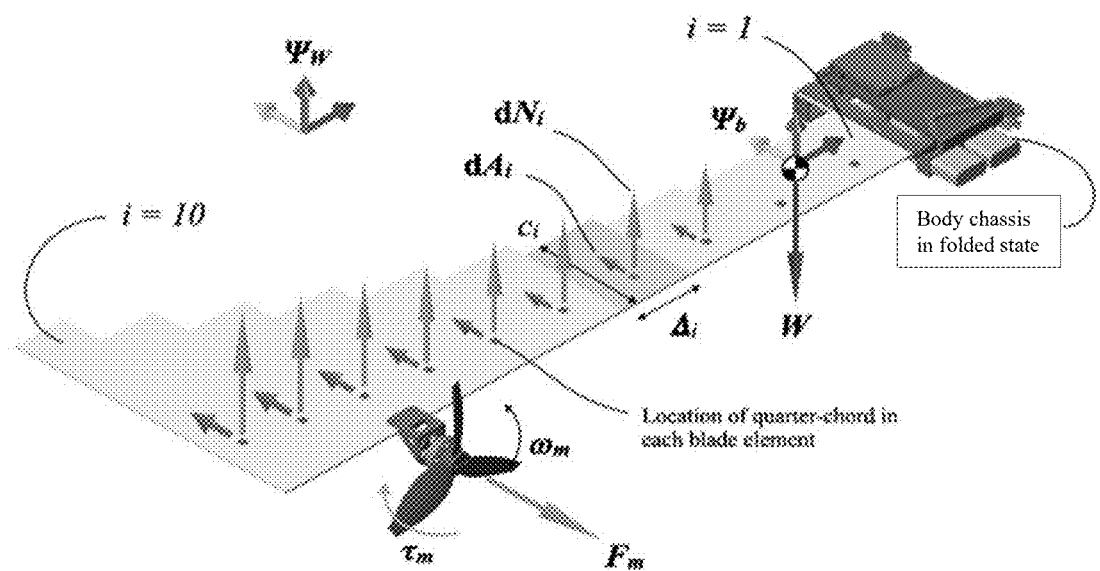
FIG. 6A is a free-body diagram of a simulated monocopter, according to various embodiments.
Figure 6B:
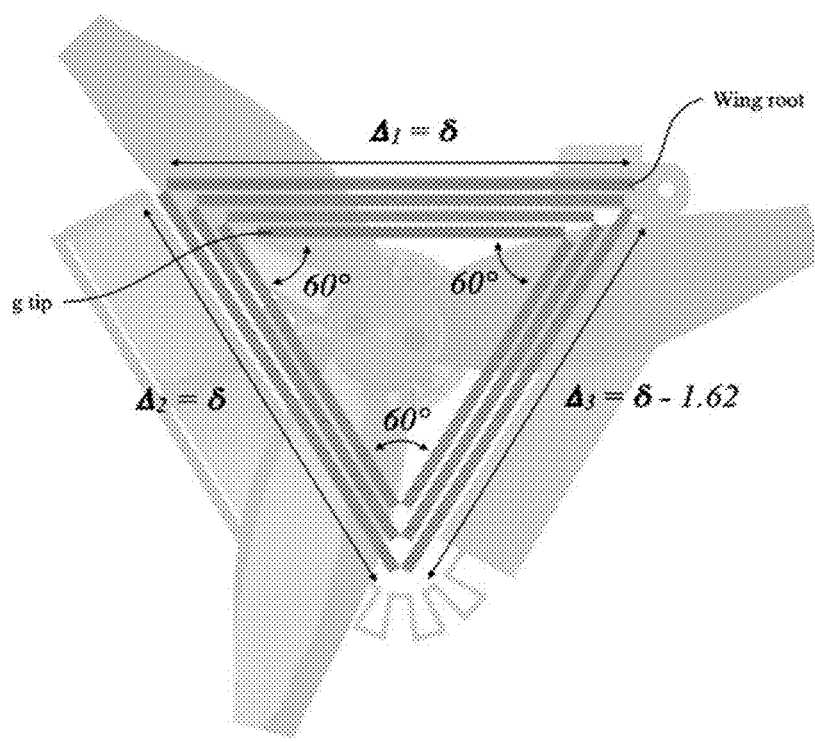
FIG. 6B is a side view of the simulated monocopter, with the wing structure of the simulated monocopter in the folded configuration, according to various embodiments.
Figure 7:
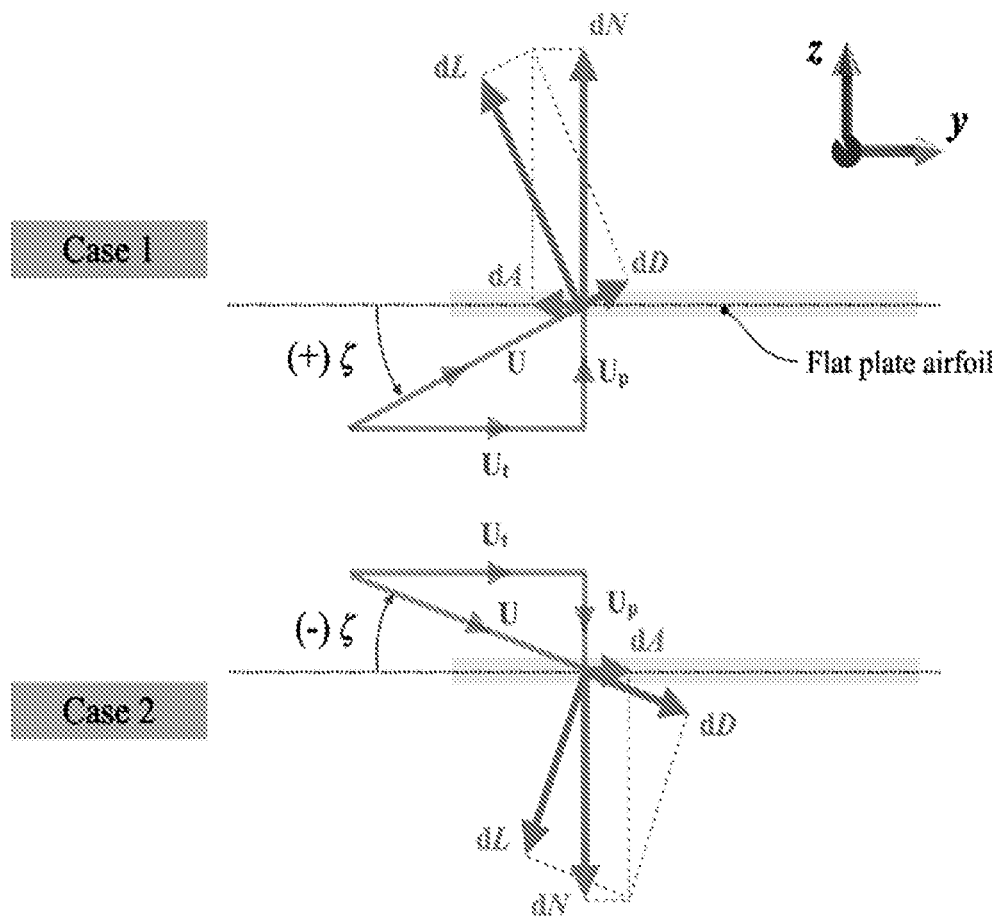
FIG. 7 depict two cases (i.e. "Case 1" and "Case 2") of relative inflow angle (for a blade element of the simulated monocopter of FIG. 6A, according to various embodiments.

FIG. 6A is a free-body diagram of a simulated monocopter, according to various embodiments;

FIG. 6B is a side view of the simulated monocopter, with the wing structure of the simulated monocopter in the folded configuration, according to various embodiments; and FIG. 7 depict two cases (i.e. "Case 1" and "Case 2") of relative inflow angle $\zeta$ for a blade element of the simulated monocopter of FIG. 6A, according to various embodiments.

According to various embodiments, to simulate and optimize the wing planform of the monocopter, according to the various embodiments, a dynamic model may be first created. FIG. 6A shows all the forces and torques acting on a simulated monocopter typically during its flight. The world frame may be denoted as $\Psi W$ and the body-fixed frame may be denoted as $\Psi b$ with its center fixed to the center of gravity of the monocopter, x-axis aligned with the longitudinal direction of the wing structure and y-axis along chordwise direction of the wing structure.

In the simulation, the battery module (i.e. power source) may be fixed at the folded configuration of the body chassis (i.e. $\alpha=0°$), thereby resulting in a smaller rotational moment of inertia of the simulated monocopter, with the center of gravity of the simulated monocopter located near the root of the wing structure.

The forces and torques acting on the simulated monocopter include the weight W, thrust and torque from motor Fm and $\tau m$ respectively, and aerodynamic forces from the wing structure. In general, the monocopter may be modelled or simulated as a rigid body in a 6 degrees of freedom environment, where the monocopter may be able to freely translate and rotate in any direction. MATLAB Simscape Multibody may be used for the simulation, where an application of 6-DOF joint automatically applies the standard formulations of 6-DOF motion which may be commonly used for simulation of aircraft and spacecraft. Simscape Multibody provides multibody simulation environment using a graphical programming interface representing relationships between bodies using joints, constraints, force elements and sensors. Forces and moments can be specified at component level, such as individual blade elements, and resolved forces and moments may be automatically computed and applied to the entire body through component relationships. Using Simscape Multibody may help ensure that human errors may be minimized in the process of manually writing, assembling and running the code for integrating the equations of motion and resolving the numerous forces and moments.

The geometries of autopilot board, 3D-printed components, battery, motor and propeller may be drawn in SolidWorks and imported into Simscape Multibody, with their exact weights applied. Hence, the mechanical properties of these elements may be precisely accounted for in the simulation. The wing structure may be generated using flat rectangular blocks to form a generic shape, which may be optimized using the simulation. In order to model the aerodynamic forces, Blade Element Theory may be applied. In particular, the wing structure may be split into $n_{be}$ blade elements (e.g. $n_{be}$ rigid wing segments). In the simulation, it is set to $n_{be}=10$ where i=1 represents the innermost blade element. $dN_i$ and $dA_i$ represent the normal and axial forces respectively acting on the i-th blade element and $c_i$ and $\Delta_i$ represent the chord length and width of that blade element. The aerodynamic forces are assumed to act on the quarter-chord location of each blade element.

The lift and drag forces generated from each blade element may be calculated using:

$$dL = \frac{1}{2}\rho U^2 c C_{ld} dr, \quad dD = \frac{1}{2}\rho U^2 c C_D dr,$$

where dL and dD may be the lift and drag forces respectively acting on the blade element, ρ may be the density of air, U may be the relative air velocity interacting with the blade element, c may be the chord length of the blade element, $C_l$ and $C_D$ may be coefficients of lift and drag respectively, and dr may be the width of the blade element. As the wing structure may be constantly flying into its own wake during hover and in most aspects of the flight, it may be assumed to be less efficient than in its ideal state. To account for this, the drag coefficients may be multiplied with a constant μ such that $C_D = \mu C_d$. This value of u may be experimentally found by flying an arbitrary configuration of the monocopter and then fine-tuning the simulated parameters to match the results. The values of $C_l$ and $C_d$ may be flat-plate airfoil coefficients obtained and linearly interpolated from NACA Technical Report 3221.

dL and dD forces may be resolved into normal and axial forces (dN and dA respectively) before being applied back into the model. In Simscape Multibody, the relative inflow angle can be found by attaching a transform sensor to measure velocities with respect to a non-rotating follower on the blade element, as shown in FIG. 7. The two cases consider all inflow velocity situations, allowing the model to be simulated in almost any scenario. dN and dA forces may be then calculated using:

$$\text{Case } 1 \begin{cases} dN = dL\cos(\zeta) + dD\sin(\zeta) \\ dA = -dL\sin(\zeta) + dD\cos(\zeta) \end{cases}$$

$$\text{Case } 2 \begin{cases} dN = -dL\cos(\zeta) + dD\sin(\zeta) \\ dA = dL\sin(\zeta) + dD\cos(\zeta) \end{cases}$$

where ζ may be the relative inflow angle of air. Due to the configuration of the monocopter, its center of gravity may be located in between the first and second blade element. As the monocopter typically rotates about its center of gravity, this may lead to a negative flow on the first blade element and a very small positive flow on the second blade element due to their close proximity to the center of rotation. The aerodynamic force contribution from these two elements may hence be assumed to be negligible. For the rest of the blade elements, the normal and axial forces may be assumed to be acting at the quarter-chord location.

The thrust unit (e.g. propulsion unit) may include or may be a brushless motor directly attached to a propeller. In order to consider the gyroscopic effects of a spinning mass (i.e. the motor bell and propeller), these components may be modelled to spin in the simulation with an estimated rotation speed of 240 rotations per second at 100 g of thrust, modelled with a direct linear relationship to the motor force. The accuracy of the simulated model may be cross-checked with an actual prototype during mid-design phase, on parameters such as the rotation speed $\Omega_Z$ and thrust T required for hover.

In order to simplify the simulation, each blade element may be assumed to be a foldable or discrete piece or panel of the semi-rigid wing structure. With reference to FIG. 6B, each blade element may make an angle of about 60° from one another, forming an equilateral triangle in a compact form factor, when the wing structure is in the folded configuration.

Due to the folding methodology, as illustrated in FIG. 6B, the width of each blade element $\Delta_i$ (e.g. measured in mm) may follow the following relationship:

$$\Delta_i = \begin{cases} \delta, & \text{if } i = 1, 2 \\ \delta - 1.62(i-2), & \text{if } i > 2 \end{cases}$$

where δ may be the parameter which may define the width of the first blade element, and hence indirectly defining the length of the wing structure, and i may be the blade element designation and $i \in Z^+$.

The flexibility of the wing structure during flight may also be considered for the simulation. Each blade element may be linked to the other using a revolute joint which allows rotational degree of freedom along y-axis of Ψb. A spring stiffness value of $k_y$ and damping coefficient of $\sigma_y$ may be applied to all the joints between the blade element. As the wing structure may also have limited flexibility along the x-axis, a single revolute joint along the x-axis may be applied between the 5th and 6th blade elements with a spring stiffness and damping coefficients of $k_x$ and $\sigma_x$ respectively. The values of the coefficients may be selected such that wing structure deformation during the flight may be similar between real life and simulation.

Figure 8:
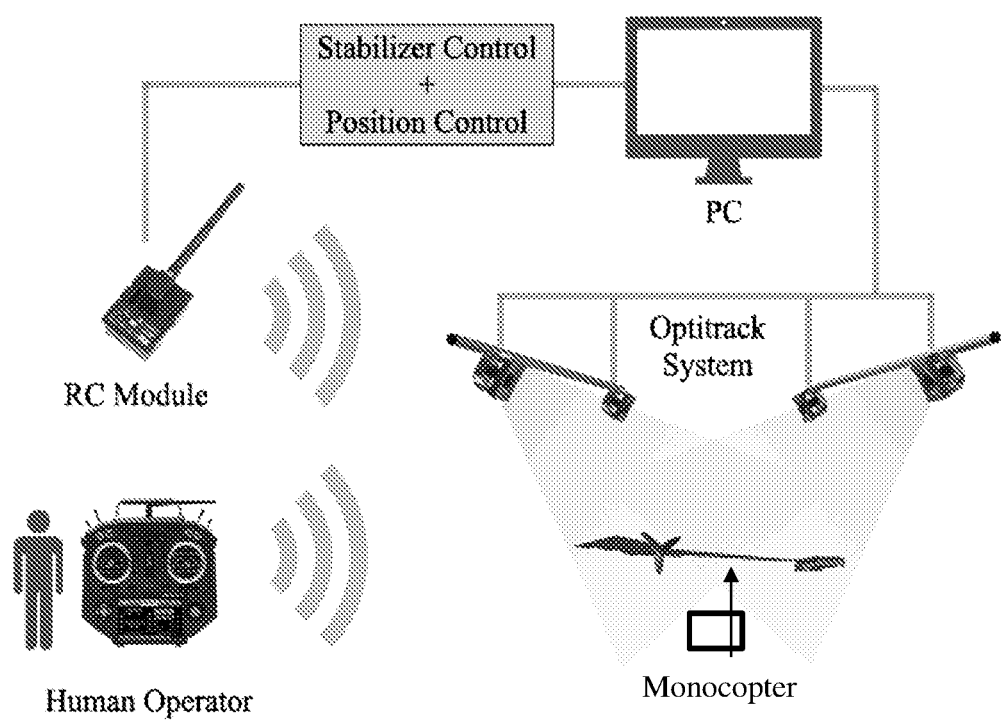
FIG. 8 is a schematic representation of an experiment setup involving the prototype of the monocopter of FIG. 3A, according to various embodiments.

FIG. 8 is a schematic representation of an experiment setup involving the prototype of the monocopter of FIG. 3A, according to various embodiments.

Experiment setup: Real-life experiments with the monocopter prototype was conducted in a motion-captured flying arena. It is within a rectangular flying space of 7 m×5 m×2.3 m in size. The entire volume is covered by 8 Optitrack Prime 41 cameras. The cameras project infra-red light into the flying space which are reflected by infra-red reflective markers mounted onto the monocopter prototype. Real-time position and orientation data from the camera system is fed into MATLAB where controller outputs are computed. The output is then sent through a RC module to the monocopter prototype. The RC module, connected to the computer and human operator, using a RC transmitter unit, is also able to send control signals to the monocopter prototype at the same time. The monocopter prototype carries two RC receivers and combines the input from both closed-loop control and human operator control. This setup, as depicted in FIG. 8, allows the human operator to take over the flight in the event of an emergency.

Figure 9:
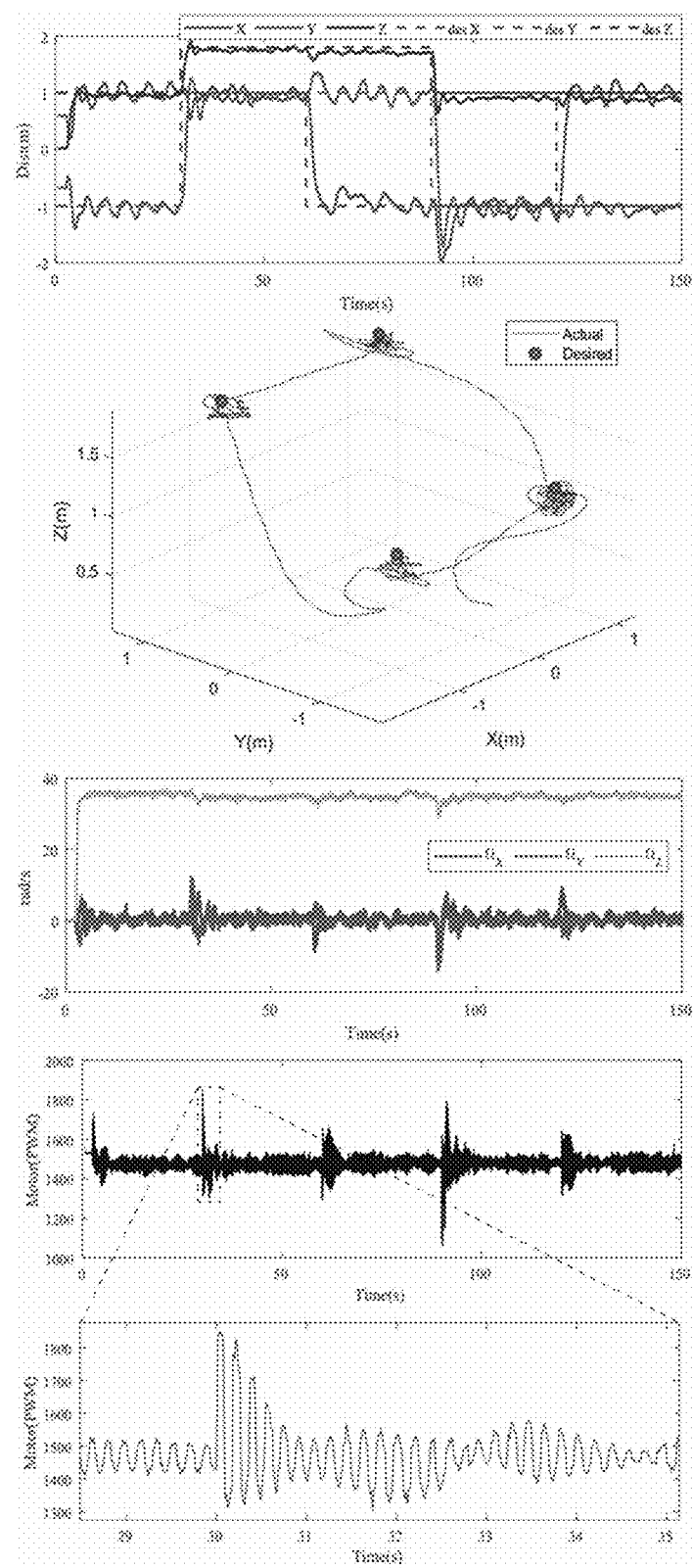
FIG. 9 are results from a closed-loop waypoint tracking experiment with the prototype of the monocopter of FIG. 3A, according to various embodiments.

FIG. 9 are results from a closed-loop waypoint tracking experiment with the prototype of the monocopter of FIG. 3A, according to various embodiments.

Closed-loop waypoint tracking experiment: the monocopter prototype is tasked to follow a waypoint trajectory. It consists of a square shape, with a side of 2 m, one side at 1 m in height and the other side at 1.8 m in height. The four corners of the square are at (1,−1,1), (1,1,1.8), (−1,1,1.8), and (−1,−1,1). Each waypoint is set for 30 seconds before moving onto the next. In the experiment, the monocopter prototype approaches the waypoint and stabilizes much faster than in the simulation. However, similar to the simulation, the monocopter prototype tends to overshoot the waypoint during the approach. ΩX, ΩY and ΩZ values are also plotted. ΩZ is noticeably less than the simulated value, most likely due to components such as the body not modelled for aerodynamics in the simulation creating high drag.

As observed in the simulation, at the instances where the waypoint is shifted to the next, spikes in ΩX and ΩY can be observed, indicating the tip path plane of the monocopter prototype is highly tilted at these points. The results are shown in FIG. 9. The PWM values sent to the motor are also shown. At the instance of waypoint shifting, high frequency fluctuations in motor command values can be observed and this may be due to square cyclic controller.

Figure 10:
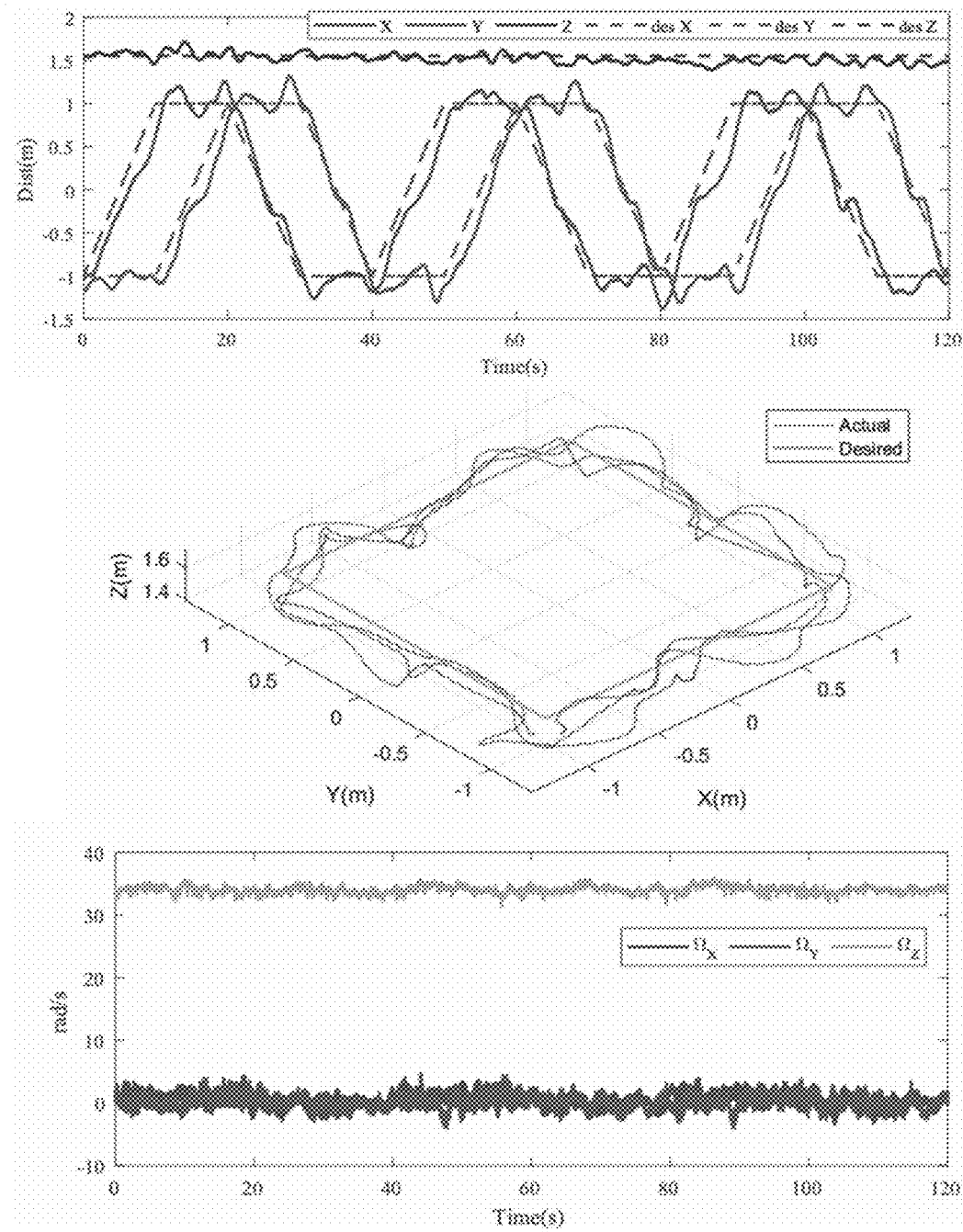
FIG. 10 are results from a closed-loop trajectory tracking experiment with the prototype of the monocopter of FIG. 3A, according to various embodiments.
Figure 11:
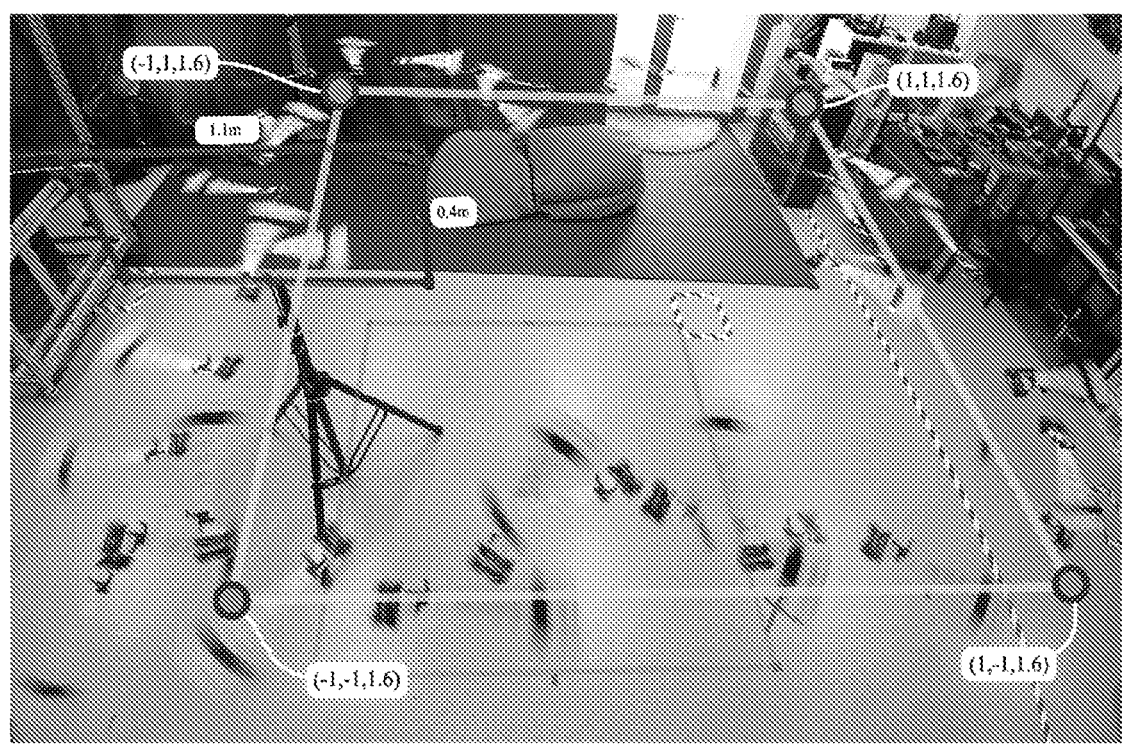
FIG. 11 is a photograph showing the prototype of the monocopter of FIG. 3A in the closed-loop trajectory tracking experiment, according to various embodiments.

FIG. 10 are results from a closed-loop trajectory tracking experiment with the prototype of the monocopter of FIG. 3A, according to various embodiments; and FIG. 11 is a photograph showing the prototype of the monocopter of FIG. 3A in the closed-loop trajectory tracking experiment, according to various embodiments.

Closed-loop trajectory tracking experiment: the monocopter prototype is tasked to follow a continuous trajectory that shifts the desired position incrementally with every time step. The trajectory is a simple square shape of 2 m length on each side. The corners of the square are at points (−1,−1,1.6), (1,−1,1.6), (1,1,1.6), and (−1,1,1.6). A duration of 10 seconds is given to move along each side of the square, resulting in a movement speed of 0.2 ms$^{-1}$. The desired position linearly moves along the square throughout the experiment. The flight performance of the monocopter prototype in its XYZ position and world frame rotational speeds are shown in FIG. 10. Unlike the previous waypoint tracking experiment, the current experiment does not involve abruptly changing desired setpoint. Hence, the movements are gentle and no large changes in tip path plane are observed. A physical object in the shape of a wide but short window is placed along one of the sides of the square. This is to demonstrate that the monocopter prototype is maneuverable (e.g. nimble) enough to fly through a window. The monocopter prototype was seen flying through this window multiple times, from which frames are extracted and shown in FIG. 11.

Figure 12:
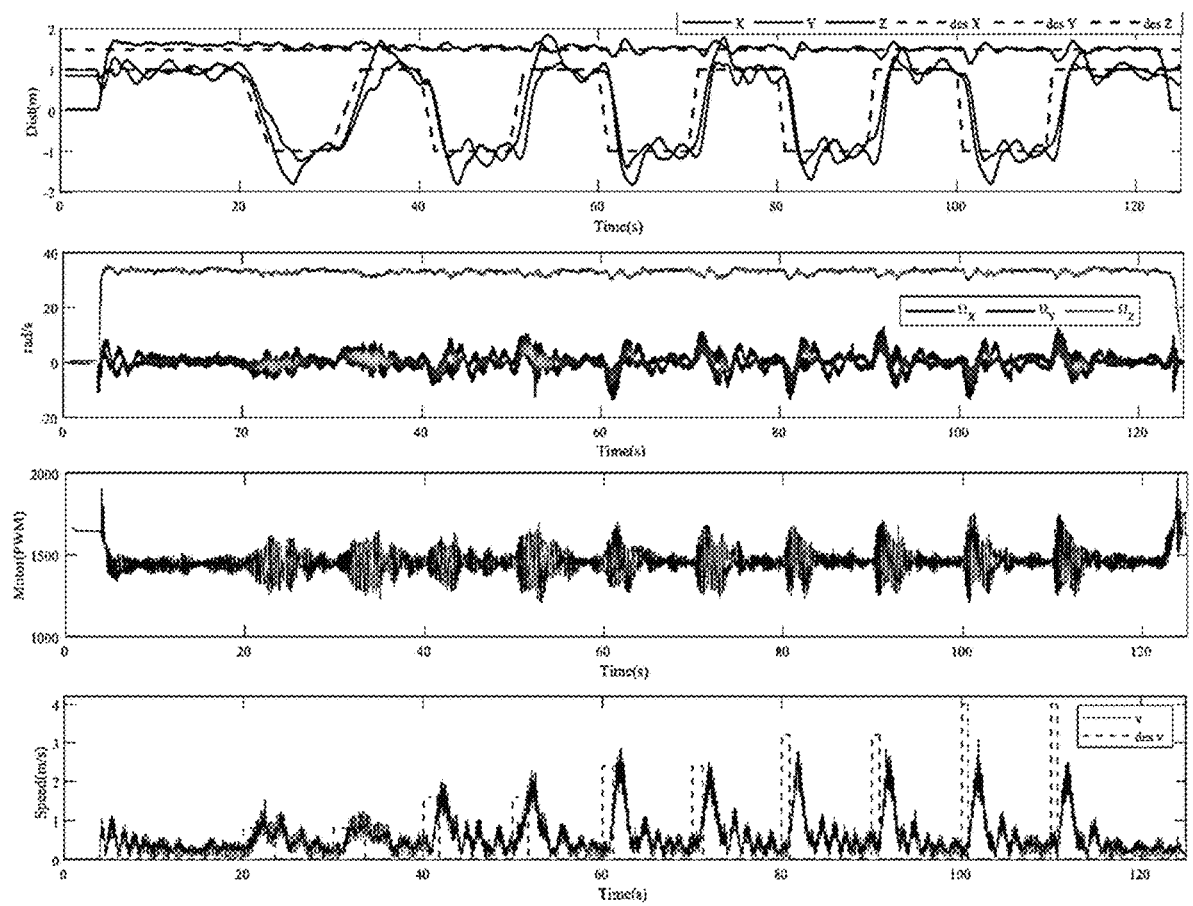
FIG. 12 are results from a straight-line speed experiment with the prototype of the monocopter of FIG. 3A, according to various embodiments.

FIG. 12 are results from a straight-line speed experiment with the prototype of the monocopter of FIG. 3A, according to various embodiments.

Straight-line speed experiment: In this experiment, the monocopter prototype is pushed to its limit of lateral speed. It is tasked to fly between two points (1,1,1.5) and (−1,−1.1.5), back and forth at increasing speed at each round using trajectory control similar to the previous experiment. A duration of 10 seconds is given for each time it moves, allowing enough time for it to stabilize at the end point before moving off again. In FIG. 12, it can be observed that the monocopter prototype is able to follow a desired or intended location in X and Y coordinates, where Z is observed to start fluctuating when faster speed is required. ΩX and ΩY are seen to fluctuate more at faster speeds, indicating greater changes to tip path plane. ΩZ is less effected as the monocopter prototype's rotation speed is not affected as much by fast flights. Large fluctuations in motor command can also be observed at the points where desire trajectory begins moving. In the last plot where the monocopter prototype's lateral velocity and desired velocity are plotted, it is more apparent that the monocopter prototype's lateral velocity seems to peak at around 2.6 ms$^{-1}$.

Figure 13:
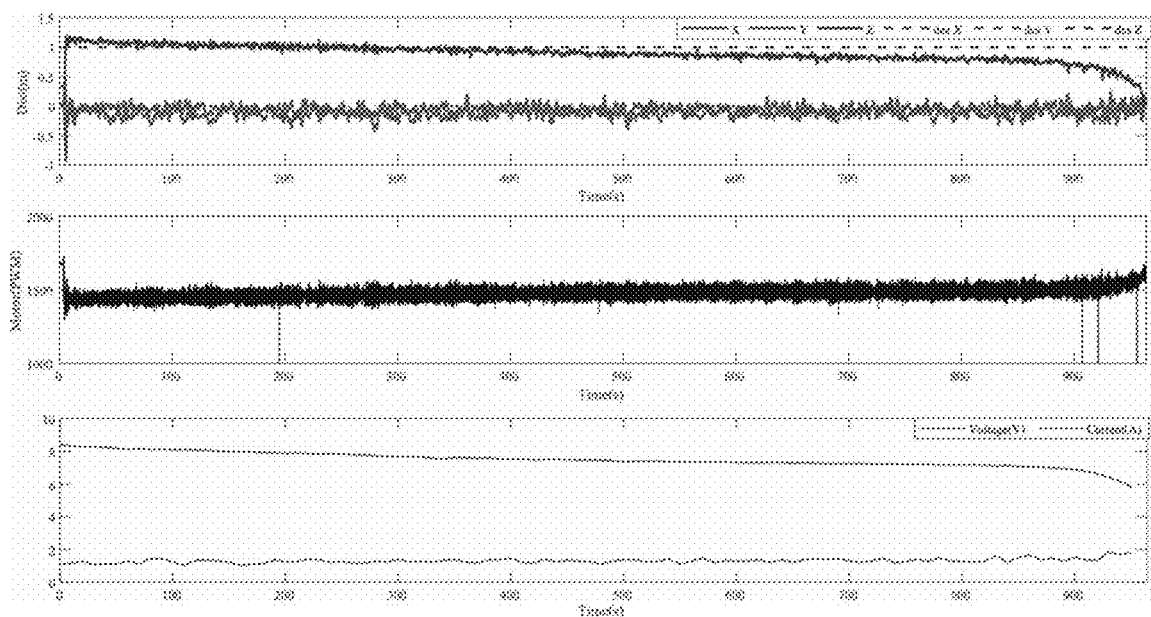
FIG. 13 are results from a flight time experiment with the prototype of the monocopter of FIG. 3A, according to various embodiments.

FIG. 13 are results from a flight time experiment with the prototype of the monocopter of FIG. 3A, according to various embodiments.

Flight time experiment: In order to find out the monocopter prototype's flight time, the monocopter prototype was flown at coordinate (0,0,1) with stabilizer and position controller enabled. FIG. 13 shows that the monocopter prototype's altitude dropped as the battery's voltage dropped. This may be improved with a better tuning or controller. It can also be observed that even with the proportional stabilizer control and PI controller for position, the monocopter prototype did not deviate much laterally, whereby the most deviation was at 0.4 m. The battery's voltage and current levels were also plotted, and the voltage appeared to drop sharply right before the end of the flight, indicating that the lithium battery was used to its maximum capacity. The total energy used for the flight was found to be at 2.6 Wh, while the battery's rated capacity is 3.2 Wh. This may be due to the fact that the battery may have degraded in capacity over several charge cycles. The mean power draw for hover flight of the monocopter prototype was found to be about 9.78 W.

Various embodiments may thus provide a versatile aerial vehicle or miniature aerial vehicle.

Particularly, various embodiments may provide a monocopter which may include a foldable wing structure (i.e. foldable wing or semi-rigid wing).

Accordingly, the monocopter with the foldable wing structure may be easy to store and transport, and may be easily deployable when needed.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A monocopter comprising:
   a body chassis;
   a wing structure extending from the body chassis, wherein the body chassis is at a root of the wing structure, wherein the wing structure comprises:
      a plurality of non-bendable wing segments distributed along a spanwise direction extending between the root and a tip of the wing structure, and
      a plurality of bendable wing segments, each bendable wing segment adjoining a pair of adjacent non-bendable wing segments of the plurality of non-bendable wing segments; and
   a propulsion unit coupled to a non-bendable wing segment of the plurality of non-bendable wing segments between a midspan of the wing structure and the tip of the wing structure,
   wherein the body chassis comprises a first member, a second member, and a hinge interconnecting the first member and the second member.

2. The monocopter of claim 1,
   wherein each bendable wing segment serves as a hinge interconnecting the pair of adjacent non-bendable wing segments of the plurality of non-bendable wing segments such that the wing structure is foldable at the plurality of bendable wing segments.

3. The monocopter of claim 1,
   wherein the plurality of non-bendable wing segments of the wing structure comprises a plurality of discrete non-bendable panels spaced apart from each other with a plurality of discontinuities among the plurality of discrete non-bendable panels,
   wherein a single bendable sheet is attached across the plurality of discrete non-bendable panels so as to expose a plurality of portions of the single bendable sheet at the plurality of discontinuities among the plurality of discrete non-bendable panels to form the plurality of bendable wing segments of the wing structure.

4. The monocopter of claim 3,
wherein each of the plurality of discrete panels is made of wood,
wherein the single bendable sheet is made of bendable plastic.

5. The monocopter of claim 3,
wherein one or more of the plurality of discrete non-bendable panels comprises a closed-loop frame structure, each closed-loop frame structure defining a through-hole.

6. The monocopter of claim 5,
wherein the single bendable sheet covers across the through-hole of each of the closed-loop frame structure of the one or more of the plurality of discrete non-bendable panels.

7. The monocopter of claim 1, further comprising:
a reinforcing plate attached to the non-bendable wing segment of the plurality of non-bendable wing segments to which the propulsion unit is coupled.

8. The monocopter of claim 7,
wherein the reinforcing plate comprises a carbon fibre plate.

9. The monocopter of claim 1,
wherein a spanwise dimension of each of the plurality of non-bendable wing segments is larger than a spanwise dimension of each of the plurality of bendable wing segments.

10. The monocopter of claim 1,
wherein the propulsion unit comprises a propeller.

11. The monocopter of claim 1,
wherein the hinge of the body chassis comprises a bendable hinge.

12. The monocopter of claim 1, further comprising:
a power source attached to the first member; and
an electrical element that electrically connects the power source to the propulsion unit.

13. The monocopter of claim 12, further comprising:
a controller attached to the second member; and
wherein the electrical element further electrically connects the controller to the propulsion unit.

14. The monocopter of claim 1, further comprising:
a coupling element for coupling the propulsion unit to the wing structure.

15. The monocopter of claim 14,
wherein the coupling element is attached to a leading edge of the non-bendable wing segment of the wing structure.

* * * * *